(12) United States Patent
Rusnak et al.

(10) Patent No.: US 10,936,992 B1
(45) Date of Patent: Mar. 2, 2021

(54) LOGISTICAL MANAGEMENT SYSTEM

(71) Applicant: Airspace Technologies, Inc., Carlsbad, CA (US)

(72) Inventors: Ryan Rusnak, Encinitas, CA (US); Calvin Linford, Oceanside, CA (US)

(73) Assignee: Airspace Technologies, Inc., Carlsbad, CA (US)

( * ) Notice: Subject to any disclaimer, the term of this patent is extended or adjusted under 35 U.S.C. 154(b) by 0 days.

(21) Appl. No.: 16/940,924

(22) Filed: Jul. 28, 2020

Related U.S. Application Data

(63) Continuation of application No. 16/833,315, filed on Mar. 27, 2020.

(60) Provisional application No. 62/934,336, filed on Nov. 12, 2019.

(51) Int. Cl.
*G06Q 10/08* (2012.01)
*G01C 21/34* (2006.01)

(52) U.S. Cl.
CPC ... *G06Q 10/08355* (2013.01); *G01C 21/3461* (2013.01)

(58) Field of Classification Search
CPC .............. G06Q 10/08355; G01C 21/3461
USPC ............................................. 705/338
See application file for complete search history.

(56) References Cited

U.S. PATENT DOCUMENTS

| | | | |
|---|---|---|---|
| 7,620,583 B2 | 11/2009 | Sundel | |
| 7,739,202 B2 | 6/2010 | Kadaba | |
| 7,751,929 B1 | 7/2010 | Prater et al. | |
| 8,131,651 B1 | 3/2012 | Bennett et al. | |
| 9,082,144 B2 | 7/2015 | Jones et al. | |
| 9,127,945 B2 | 9/2015 | Telange et al. | |

(Continued)

FOREIGN PATENT DOCUMENTS

| | | | |
|---|---|---|---|
| WO | WO 01/13261 A1 | 2/2001 | |
| WO | WO-2014178055 A1 * | 11/2014 | ............ G06Q 10/08 |

OTHER PUBLICATIONS

GeeksforGeeks. "Minimum cost path from source node to destination node via an intermediate node". Published Aug. 22, 2018. https://www.geeksforgeeks.org/minimum-cost-path-from-source-node-to-destination-node-via-an-intermediate-node/ (Year: 2018).*

(Continued)

*Primary Examiner* — George Chen
*Assistant Examiner* — Lisa Ma
(74) *Attorney, Agent, or Firm* — Sterne, Kessler, Goldstein & Fox P.L.L.C.

(57) ABSTRACT

Disclosed herein are system, method, and computer program product for a transporting of a good. An embodiment operates by receiving a user request for the transporting of the good from a pickup location to a destination location. Thereafter, a corresponding pickup, first intermediate, a second intermediate, and destination node are identified on a pre-generated graph, and transportation edges each relating to a transit cost associated with one of the pickup, first intermediate, second intermediate, and destination locations. Subsequently, a subgraph of of the pre-generated graph comprising the pickup, first intermediate, second intermediate, and destination node, as well as the transportation edges, are generated. Based on the subgraph, Based on subgraph, a preferred route from the pickup location to the destination location having a lowest transit cost for transporting the good is generated.

18 Claims, 30 Drawing Sheets

(56) References Cited

U.S. PATENT DOCUMENTS

| | | |
|---|---|---|
| 2006/0145837 A1 | 7/2006 | Horton et al. |
| 2006/0282277 A1 | 12/2006 | Ng |
| 2008/0162304 A1* | 7/2008 | Ourega ............. G06Q 30/0601 705/26.4 |
| 2009/0125355 A1 | 5/2009 | Handel et al. |
| 2010/0280748 A1 | 11/2010 | Mundinger et al. |
| 2010/0305984 A1* | 12/2010 | Ben-Yitschak ...... G06Q 10/025 705/6 |
| 2012/0310691 A1* | 12/2012 | Carlsson ................ G08G 1/202 705/7.13 |
| 2014/0304188 A1 | 10/2014 | Lavoie et al. |
| 2014/0358703 A1 | 12/2014 | Stuntebeck et al. |
| 2015/0096266 A1 | 4/2015 | Divine et al. |
| 2015/0120600 A1* | 4/2015 | Luwang ........... G06Q 10/08355 705/338 |
| 2015/0186869 A1 | 7/2015 | Winters et al. |
| 2015/0220999 A1* | 8/2015 | Thornton ........... H04M 15/8011 705/14.66 |
| 2015/0278758 A1 | 10/2015 | Kim et al. |
| 2016/0117618 A1 | 4/2016 | Wang et al. |
| 2016/0140632 A1 | 5/2016 | Kandala et al. |
| 2016/0171515 A1* | 6/2016 | Radhakrishnan .. G06Q 30/0206 705/7.35 |
| 2016/0180274 A1 | 6/2016 | Zwakhals et al. |
| 2017/0200131 A1* | 7/2017 | van't Westeinde ......................... G06Q 10/06311 |
| 2018/0107967 A1 | 4/2018 | Bulcao et al. |
| 2019/0236523 A1 | 8/2019 | Bulcao et al. |

OTHER PUBLICATIONS

International Search Report and Written Opinion of the International Searching Authority directed to related International Patent Application No. PCT/US17/56753, dated Feb. 2, 2018; 13 pages.
International Preliminary Report on Patentability directed to related International Patent Application No. PCT/US17/56753, dated Apr. 23, 2019; 10 pages.
Jedermann et al., "Reducing food losses by intelligent food logistics," published by the Royal Society, Jun. 2014.

* cited by examiner

FIG. 2

| ALL ORDERS | GROUND | INFO | FREIGHT | HEALTHCARE | STAT | MCP | ROUTED | ESCALATED | WILL CALL |
|---|---|---|---|---|---|---|---|---|---|
| 239171 | | EN ROUTE TO PICKUP →SEA • SEA | | KIP O'SHAUGHNESSY | | THE POLYCLINIC →THE POLYCLINIC MADISON CENTERXXXX | | | NO FOLLOW UP TIME |
| 239169 | | OPS ACKNOWLEDGED GMC • MO | | | | MIRACLES IN SIGHT (MIRACLES IN SIGHT • JOHN S. CONNOR) | | | NO FOLLOW UP TIME |
| 239168 | | EN ROUTE TO DESTINATION →LLC • LLC | | MOSES ILUNGA | | LABCORP MA—SLC (XXXXX CLINIC • RT (ST. MARK'S HOSPITAL) | | | NO FOLLOW UP TIME |
| 239158 | | EN ROUTE TO DESTINATION →DEN • DEN | | ALEX (NUTCHA) PRINDAVONG | | LABCORP MA—DEN (XXXXXFIELD PROS 144TH • LABCORP) | | | NO FOLLOW UP TIME |
| 239154 | | CUSTOMER COMPLETED →MD • ORD | | | | DB SCHENKER—AOG (XXXXXXXXXX AEROSPACE • AIR FINANCE CA... | | | NO FOLLOW UP TIME |
| 239140 | | EN ROUTE TO PICKUP →STL • STL | | 24/7 EXPRESS LOGISTICS | | ROI—STAT (MERCY HOSPITAL • MERCY HOSPITAL_XXXX | | | NO FOLLOW UP TIME |
| 239126 | | EN ROUTE TO PICKUP MEM • LIN | | TERRANCE COVINGTON | | MCKESSON PLASMA AND BIOLOGICS LLC (XXXXXXX MEMPHIS DC • XXXXXXX XXX CIMP... | | | |
| 239125 | | OPS ACKNOWLEDGED LAX • DNK | | | | PANAL.PINA (LAX • XXXXXXX • INTEL OCOTILLO) | | | 43 MINUTES AGO • PA PENDING QUOTE APPRO... |
| 239039 | | ACCEPTED BY AIRPLANE DFW • PHI | | 35830406 | | CEVA • LOCKHEED (CEVA • XXX • LOCKHEED MARTIN) | | | 33 MINUTES AGO • SCH FLT DEP/COB/DISP |
| 239067 | | EN ROUTE TO DESTINATION →USA • USA | | DRIVER 5 ATLEAS TRANSPORT LLC | | CALIFORNIA CRYOBANK • NEW YORK (CALIFORNIA CRYOBANK • XXXXXXXXXXXXXXXX... | | | 33 MINUTES AGO • CCNF ETA |
| 239081 | | EN ROUTE TO PICKUP →MEX • MEX | | BLAZE COURIER(LOGISTICS), LLC → MSY | | CONTACT TOWERS INTERNATIONAL (LOCKHEED MARTIN (LOCATED ON NASA BACK... | | | 33 MINUTES AGO • CCNF ON SITE PU |
| 239089 | | ACCEPTED BY AIRLINE XXX • XXX | | 35851174 | | CEVA • LOCKHEED (XXXXXXX • LKK • LOCKHEED MARTIN (XXXXXXXXXX... | | | 33 MINUTES AGO • CCNF TENDER |
| 237965 | | ACCEPTED BY AIRLINE DFW • LAX | | LESLEY WINGATE XXXXXXX | | DB SCHENKER • AOG (SCHENKER, INC • DFW • (QUANTAS CARGO LAX) | | | 33 MINUTES AGO • EV ON THIS • MISSING TRAC... |
| 239062 | | EN ROUTE TO PICKUP →USA • USA | | DRIVER 5 ATLAS TRANSPORT LLC | | CALIFORNIA CRYOBANK • NEW YORK (CALIFORNIA CRYOBANK • XXXXXXXXXXXXXXXX... | | | 28 MINUTES AGO • CCNF DB |
| 238998 | | REACHED DESTINATION AIRPORT PHX • MCI | | CROSSROADS COURIER • MCI XXXXXXX | | DONOR NETWORK OF ARIZONA (DONOR NETWORK ARIZONA • UNIVERSITY O... | | | 23 MINUTES AGO • SCH REC |
| 238554 | | EN ROUTE TO DESTINATION →ATL • ATL | | TOBIN OLUWO | | CONTROL TOWERS INTERNATIONAL (TUCSON • ATL • XXXXXXX) | | | 18 MINUTES AGO • CONF ONSITE PU |
| 238680 | | ARRIVED AT DESTINATION →ALA • JFK | | WORLD CONNECT | | PANAL.PINA (XXXXXXX LLC • DELTA JFK) | | | 18 MINUTES AGO • NEED MCPOD |
| 238743 | | ARRIVED AT DESTINATION | | ELVIS ROALES | | DB SCHENKER • AOG | | | 18 MINUTES AGO • CONF ONSITE TO TENDER... |

LOGISTICAL MANAGEMENT SYSTEM

CROSS-REFERENCE TO RELATED APPLICATION

This application claims the benefit of U.S. Non-Provisional patent application Ser. No. 16/833,315, filed on Mar. 27, 2020, which claim priority to U.S. Provisional Patent Application No. 62/934,336, filed on Nov. 12, 2019, both of which are incorporated herein by reference in their entirety.

BACKGROUND

Current logistical companies manually insert orders for transportations of goods into their system. In doing so, current logistic companies have to manually determine an appropriate route for the goods to get from its current location to a destination location, which sometimes includes stops until arriving at the destination location. As such, current logistical companies must manually determine an appropriate transporter (e.g., a truck, a train, and a flight) for each leg of the transport. Accordingly, current logistic companies are unable to automatically determine an appropriate route and transporters for goods upon receipt of the order. Along these lines, current logistical companies are unable to systematically take into account the user's preferences. As such, current logistical companies are unable to automatically determine that a preferred route for one user may not be a preferred route for another user.

BRIEF DESCRIPTION OF THE DRAWINGS

The accompanying drawings are incorporated herein and form a part of the specification.

FIGS. 2-4 are example user interfaces of a user request application, according to some embodiments.

FIG. 22 is an example user interface of a transport manager application, illustrating a plurality of orders from different users, according to some embodiments.

FIG. 23 is an example user interface of a transport manager application, illustrating a particular order, according to some embodiments.

Figure 24:
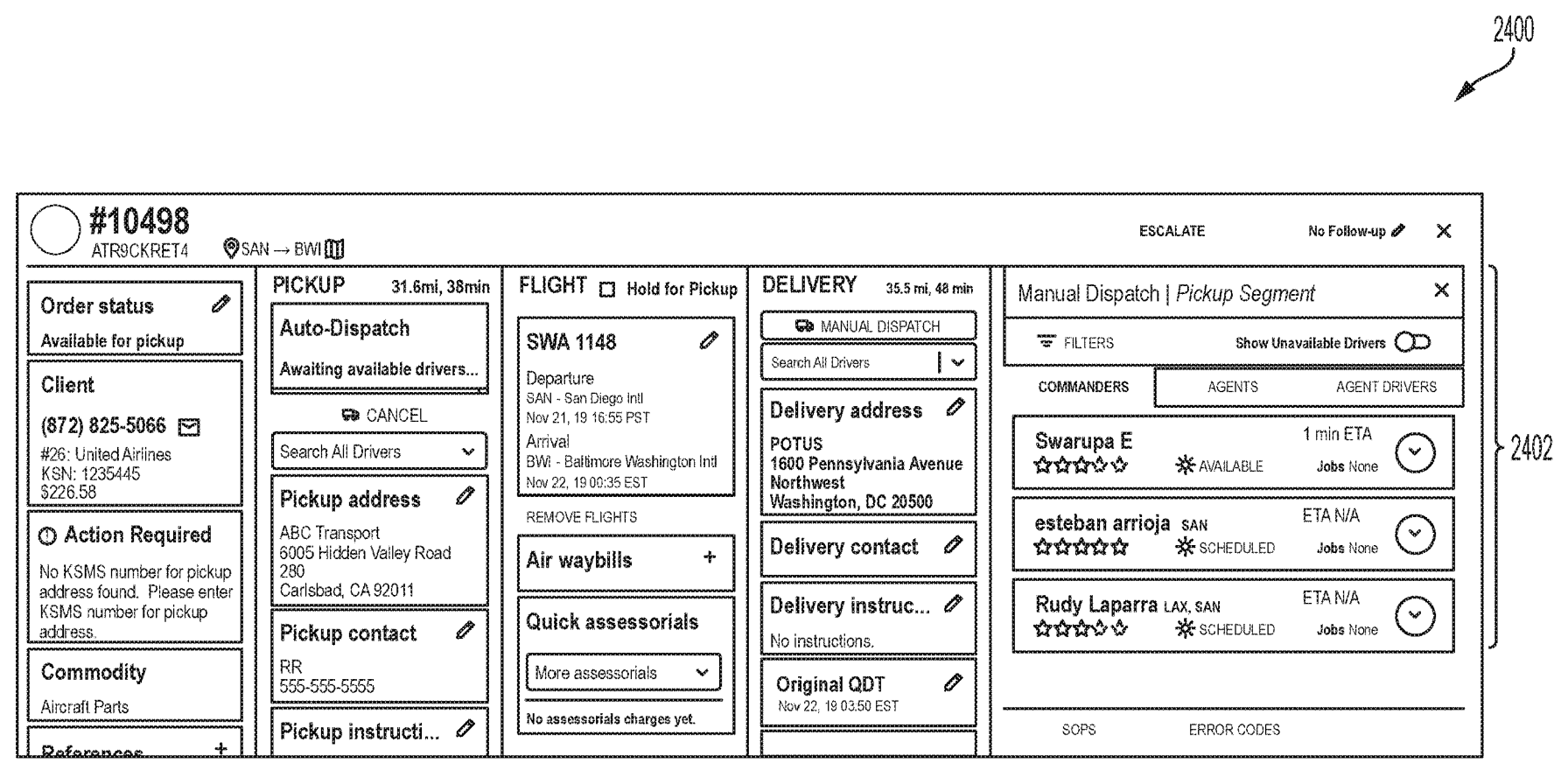

FIG. 24 is an example user interface of a transport manager application, illustrating dispatching a transporter for the transport of a particular order, according to some embodiments.

FIG. 25 is an example user interface of a transport manager application, illustrating a digest of a particular order, according to some embodiments.

In the drawings, like reference numbers generally indicate identical or similar elements. Additionally, generally, the left-most digit(s) of a reference number identifies the drawing in which the reference number first appears.

DETAILED DESCRIPTION

Figure 1:
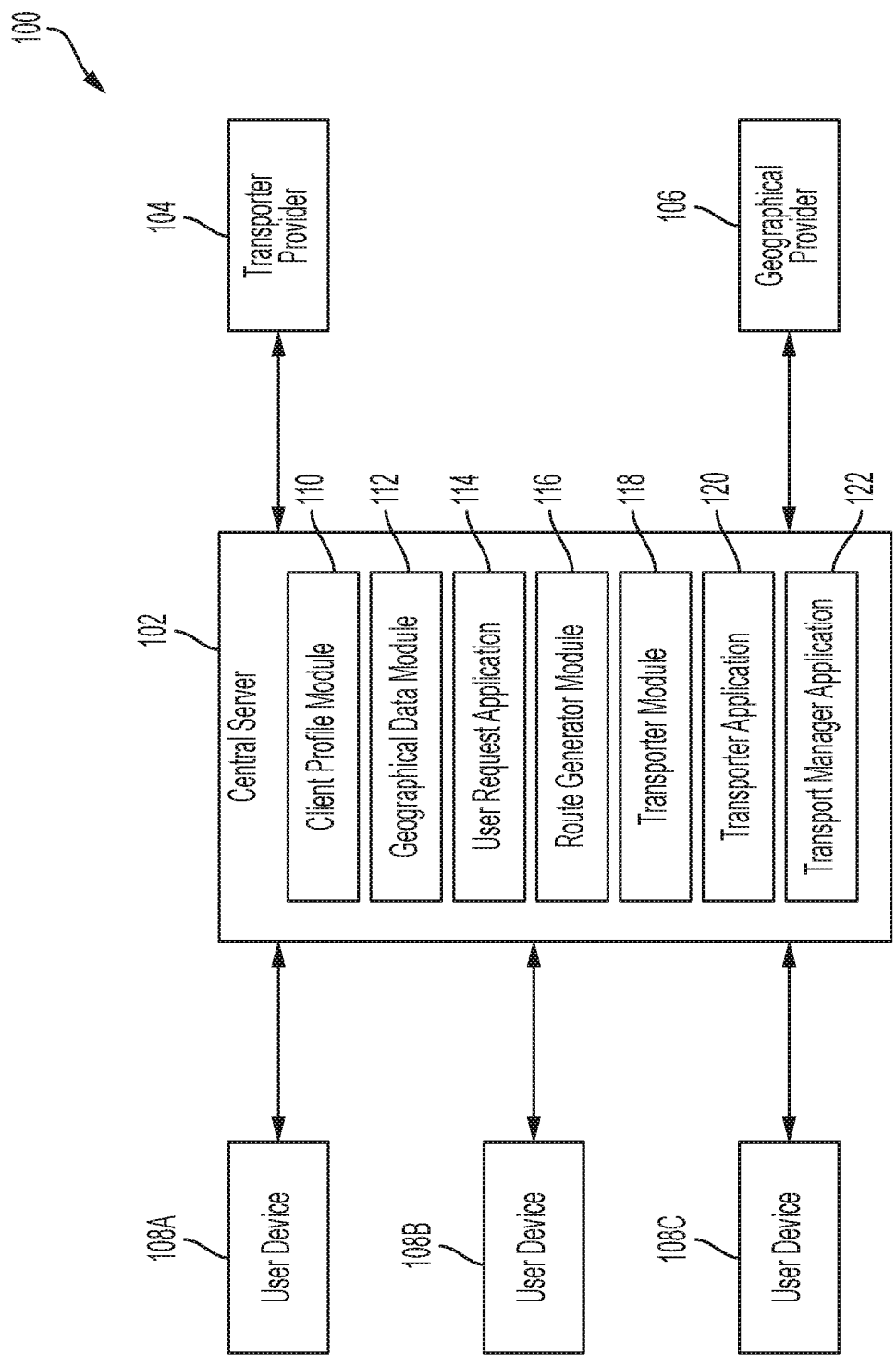
FIG. 1 is a block diagram of an example logistical management system, according to some embodiments.

Provided herein are system, apparatus, device, method and/or computer program product embodiments, and/or combinations and sub-combinations thereof, for providing an end-to-end suite for managing the transport of goods from receipt of an order to transport of the goods to a destination location.

Current logistical systems have many shortcomings in automatically determining an appropriate route from a pickup location to a destination location, upon receipt of a request for transport of goods, and without assistance from a user. First, current logistical systems typically require user intervention for determining the appropriate route and coordinating the transportation of the goods among stops (e.g., pickup location, intermediate locations, and destination location) of the appropriate route. Specifically, upon receipt of the request, authorized users typically manually determine the appropriate route from the pickup location to the destination location. In doing so, authorized users will communicate with transporters and/or methods of transportation to arrange for transport of the goods. As such, for example, authorized users will communicate with a transporter (e.g., a driver) to pick up goods from a pickup location and deliver the goods to a first intermediate location (e.g., an airport). Authorized users will then communicate with a transportation company for transportation of the goods from the first intermediate location to a second intermediate location (e.g., an airport). Authorized users will then communicate with a transporter (e.g., a driver) to pick up the goods from the second intermediate location and deliver the goods to a destination location.

Second, current logistical systems do not consider the preferences of users requesting the transport of goods. For example, current logistical systems do not consider that some users do not like particular methods of transportation (e.g., airplane or train) or particular carriers (e.g., United Airlines or BNSF Railway), to provide a few examples. Accordingly, when determining the appropriate route, current logistical systems do not accurately determine modified costs for different possible routes (and segments) based on user preferences.

Third, current logistical systems do not consider many variables inherent to various possible routes from the pickup location to the destination location. For example, current logistical systems do not consider a transport time for particular transporters (e.g., drivers) to arrive at pickup locations and deliver goods to intermediate and destination locations. Further, current logistical systems do not consider a tender time for particular transporters to receive goods at a pickup location and deliver goods to intermediate and destination locations. Accordingly, when determining the appropriate route, current logistical systems do not consider that different pickup, intermediate, and destination locations have different transport and tender times. In addition, current logistical systems do not consider that transport and tender times may depend on the transporter. For example, some transporters are slower or faster than other transporters.

Fourth, when determining transporters to pick up goods from the pickup or intermediate locations and deliver the goods to the intermediate or destination locations, current logistical systems do not consider all possible transporters capable of transporting the goods. For example, some logistical systems solely determine transporters based on an actual cost. Other logistical systems do not properly compare transporters.

In overcoming the aforementioned shortcomings, the present disclosure provides a central server including a user request application, a route generator module, a transporter application, and/or a transport manager application. The user request application receives a request for transport of a good from a recipient of the good (e.g., a consumer or a hospital) or a transportation company (e.g., United Parcel Service or FedEx Corporation). The request includes a pickup location, a destination location, a service type (e.g., recommended, fastest routing, economy routing, and drive-only) and a commodity type (e.g., aircraft parts, computer equipment, documents, electronic equipment, medical device/part, other, etc.).

In some embodiments, upon submission of the order, for determining a preferred route from the pickup location to the destination location, the route generator module receives a pre-generated graph from geographical data module. The pre-generated graph has geographical data, including all possible pickup locations, possible intermediate locations, and/or possible delivery locations. Route generator module may then translate the graph and identify the pickup and delivery locations specified in the request and all possible intermediate locations. Route generator module may then identify all possible routes from the pickup location to the delivery location, which may include one or more intermediate routes.

As such, the transportation graph may include many possible transportation segments making up the possible routes from the pickup location to the destination location and possibly including possible intermediate locations. For example, the possible transportation segments may be from the pickup location, various possible intermediate locations, from the numerous possible intermediate locations to other possible intermediate locations, and from these possible intermediate locations to the destination location. The possible transportation segments may relate to the same or different transportation types (e.g., cars, trains, flight). For example, one possible route may be a drive from a pickup location (e.g., a manufacturing center) to an intermediate location (e.g., a trucking stop) and then from the intermediate location to a destination location (e.g., a store). Another possible route may include a drive from a pickup location (e.g., a hospital) to a first intermediate location (e.g., an airport), a flight front the first intermediate location to a second intermediate location (e.g., an airport), and a drive from the second intermediate location to a destination location (e.g., hospital).

Route generator module may then identify one more transportation edges for each of the pickup location, the intermediate transportation location, and the delivery location. The transportation edges may relate to a time or a cost relating to the pickup location, the intermediate transportation location, the delivery location, and/or the segments between the locations. The transportation edges may relate to a travel time between locations, a cargo time at specific locations, and a tender time at specific locations, as will be described in more detail below.

Subsequently, the route generator module determines a preferred route based on the possible transportation segments having the lowest actual cost (provided by transporters), for example, using a search algorithm such as A-star (A*). As such, the preferred route may be determined irrespective of an actual cost or a modified cost, as discussed below (e.g., fastest route possible). Conversely, the preferred route may depend on the transportation cost, a user preference, and a likelihood of route approval. In some embodiments, the user preference may be an airline, a flight, or a time of day. In some embodiments, the user preferences include a user's value of time, which may be based on a likelihood of route approval. As such, the preferred route may depend on the likelihood of route approval independent of the user preferences.

Further, in some embodiments, upon submission of the order, a transporter application then determines a preferred transporter to transport a good from a pickup location to an intermediate location, from the intermediate location to another intermediate location, and/or from the intermediate location to the destination location. In determining the preferred transporter, the transporter application identifies transporters within a predetermined distance from the pickup location. In some embodiments, the transporters may be scheduled to transport goods for another users. The transporter application then determines if the identified transporters are eligible based on the goods commodity type. For example, some goods may require transporters to have certified licenses or appropriate transportation carriers (e.g., refrigeration, weight). The transporter application also determines if the identified transporters are solicitable. For example, the transporter application confirms that the transporter is able to transport goods to an intermediate or delivery destination prior to the specified times of the route generator module or user.

The transporter application thereafter determines an estimated completion time for transporters to transport the goods to the destination location. In doing so, the transporter application may utilize a transporter model for determining an estimated completion time (ECT) for completing all jobs for each eligible transporter. Based on the estimated completion time, the transporter application selects a preferred transporter. In some embodiments, the preferred transporter is scheduled to pick up and deliver goods for another order before delivering the solicited order.

The transporter application then sends a request to transport the goods to the preferred transporter and waits an allotted time for acceptance. If the transporter application does not receive an acceptance within the allotted time, the transporter application restarts the process of identifying a preferred transporter. In some embodiments, the transporter application may consider transporters that did not accept the same job within the allotted time, for example, by denying or not responding to the request.

In addition, in some embodiments, upon the submission of the request, the transport manager application may create a record of the order and place the order in a queue of orders. In doing so, the transport manager application may identify the type of goods and designate them to a special operations team trained to handle their transport. The transport manager application may permit members of the special operations team to designate scheduled actions, create or edit preferred routes (discussed below), select transporters for different segments, designate tasks to transporters, and specify rewards for completing tasks.

The transport manager application may also be in communication with the route generator module to receive the preferred route and the required pickup times associated with the pickup location, intermediate locations (if applicable), and destination location. Accordingly, the transport manager application may sort the orders based on the scheduled times for various actions and/or preferred departure times for routes. As such, the orders having upcoming scheduled action times or upcoming preferred route times may be provided first, whereas orders having later scheduled action times or later scheduled preferred route times may be provided last. In doing so, the transport manager application may present the order a specified color (e.g., red, yellow, and green) based on the schedule action and/or preferred route time.

Accordingly, to overcome the shortcoming of current logistical systems, the present disclosure's logistical system improves the processing of computing devices for at least the following reasons. First, after receiving an order, computing devices store a location of a pickup and destination node (e.g., a pickup and destination location) in memory. Computing devices then attempt to identify additional routes for the goods. To do so, computing devices may be in communication with external providers (e.g., transportation providers) to identify intermediate nodes (e.g., intermediate locations) for changing transportation carriers during the transport to the destination location, and then, to store these intermediate nodes in memory. Computing devices are further able to identify the different transportation methods between the same nodes (e.g., pickup to intermediate, intermediate to intermediate, and intermediate to destination). As such, computing devices are able to store each possible manner to travel from one particular node to another particular node. These may be considered segments and are stored in memory.

After storing the different segments in memory, computing devices determine an actual cost for each segment, transit time for each segment, and/or a likelihood of route approval for each possible combination of segments. To do so, computing devices may pull data (e.g., travel time, travel cost) from external transportation sources. Computing devices may then determine a user value for each segment based on the transit time and actual cost for the associated segment, as well as the user's value of cost or time. For example, the user may value 1 minute as $3. Alternatively, the user may value 10 minutes as $1. Computing devices may then store the user value associated with that segment in memory.

Thereafter, computing devices utilize a pathfinding algorithm (e.g., A*) to traverse through each possible combination of segments stored in memory. In doing so, computing devices are able to identify the best path for a user based on the segments associated costs. This can be performed automatically without user input and be based on the user's past orders.

FIG. 1 is a block diagram of an example logistical management system (LMS) 100, according to some embodiments. LMS 100 may include central server 102, transporter provider 104, geographical provider 106, and/or user devices 108A-C. As will be discussed in more detail below, central server 102 may receive and process requests for transporting goods from users of user devices 108A-C. As such, in some embodiments, users sending the requests may be from those in possession of the goods (e.g., owners of the goods). In some embodiments, users may be a carrier delivery service company (e.g., United Parcel Service or FedEx Corporation). User devices 108A-C may be a personal digital assistant (PDA), a desktop workstation, a laptop or notebook computer, a netbook, tablet, a smartphone, or any other type of electronic device, to name a few non-limiting examples.

Central server 102 may be in communication transporter provider 104 and/or geographical provider 106. Transport provider 104 may provide transport data of various transportation modes (e.g., airlines, trains, freight trucks). In some embodiments, central server 102 is in communication with multiple transportation providers 104 providing transportation information for specific types of transportation and/or companies. For example, transportation providers may be American Airlines, Amtrak, and J.B. Hunt Transport Services. As such, central server 102 may be in communication with multiple different transportation providers 104 of the same or different types (e.g., train carriers, airline carriers, and vehicle carriers).

Further, geographical provider 106 may provide geographical data required to process the request. As will be discussed in more detail below, the request includes a pickup and destination location, and, in processing the request, central server 102 may identify intermediate locations, which relate to stops between the pickup location and the destination location. Accordingly, geographical provider 106 may provide geographical data relating to the pickup, intermediate, and destination locations. As such, where the transporter is a vehicle, geographical data may include traffic and navigational data to pick up, intermediate, and destination locations at different times and days. Along these lines, geographical data may also be information on the pickup, intermediate, and destination location (e.g., parking, precise pickup locations (e.g., department), walking directions, and a map). Geographical provider 106 may continually provide geographical data in real-time.

In receiving and processing requests, central server 102 includes user profile module 110, geographical data module 112, user request application 114, route generator module 116, transporter module 118, transporter application 120, and/or transport manager application 122.

User profile module 110 stores user profiles. As discussed above, users may be a transportation company requesting transport of goods for their users (e.g., clients) or those requesting transport of their goods. As such, user profiles may be for the transportation companies requesting transport for their users or those wishing to transport their own goods. User profiles may include personal information (e.g., a name, a home address, a phone number, and an email address), previous shipping information (e.g., types of previously transported goods, sizes of previously transported goods, previous departing locations, and previous destination locations), user preferences (e.g., a particular transportation type or carrier). Further, in some embodiments, as will be discussed in more detail below, user profiles may include a user value of time (which is used to derive a recommended route for the user).

Geographical data module 112 may store geographical data received from geographical provider 106 and/or from an authorized user. The geographical data may relate to the transport of goods. As discussed above, transporters may pick up goods from a pickup location or an intermediate location, and drop off the goods at the intermediate location, another intermediate location, or the destination location. In some embodiments, the geographical data may relate to possible pickup locations, possible intermediate locations, and possible destination locations. The possible pickup and destination locations may be any physical location relating to the user seeking transport of the good, such as a personal residence (e.g., a house) or a place of business (e.g., a package delivery company, a hospital, a car manufacturer). The possible intermediate locations may be related to one or more modes of transportation. In some embodiments, the modes of transportation may be rail (e.g., trains), air (e.g., airlines), road (e.g., cars, trucks). In some embodiments, the possible intermediate locations may be physical locations related to the modes of transportation. For example, where the mode of transportation is air, the possible intermediate locations may private or public airports. Likewise, where the mode of transportation is road, the possible intermediate locations are truck stops.

Further, in some embodiments, geographical data module may also include transit information relating to the possible pickup locations, the possible intermediate locations, and the possible destination locations. In some embodiments, the transit information may also include prescheduled departure dates and times, prescheduled arrival dates and times, and/or prescheduled transport time, for example, for an airline and/or a freight. In some embodiments, geographical data may also include cutoff times before departure for receipt of goods, for example, for an airport or a train station.

Along these lines, the transport data may also relate to each possible route from the possible pickup locations to the possible intermediate locations or the possible destination locations and from the possible intermediate locations to other possible intermediate locations and the possible destination locations. In some embodiments, the transit information may include driving data (e.g., navigational data, traffic data, road closure data, etc.) from. Along these lines, geographical data module 112 may receive updates form geographical provider 106 relating to the transit information (e.g., new departure dates and updates, new arrival dates and times, new transport times, new routes, etc.).

Geographical data module 112 may also generate a graph for route generator module 116 to utilize for generating a preferred route from a pickup location to a destination location. Geographical data module 112 may generate a graph (pre-generated graph) based on geographical data received from geographical provider 106 and/or provided by an authorized user. In some embodiments, the pre-generated graph includes nodes of all possible pickup locations, possible intermediate locations, and/or possible destination locations. In some embodiments, the graph further includes all possible routes for traveling from the possible pickup locations to the possible intermediate locations, from the possible pickup locations to the possible destination locations, from the possible intermediate locations to other possible intermediate locations, and/or from the possible intermediate locations or to possible destination locations.

User request application 114 receives requests for transporting goods from user devices 108A-C. User request application 114 may then process a request for transporting goods from starting a pickup location to a destination location. As discussed above, intermediate companies may utilize user request application 114 on behalf of their consumers. Additionally, consumers may directly utilize user request application 114 to transport goods.

Figure 2:
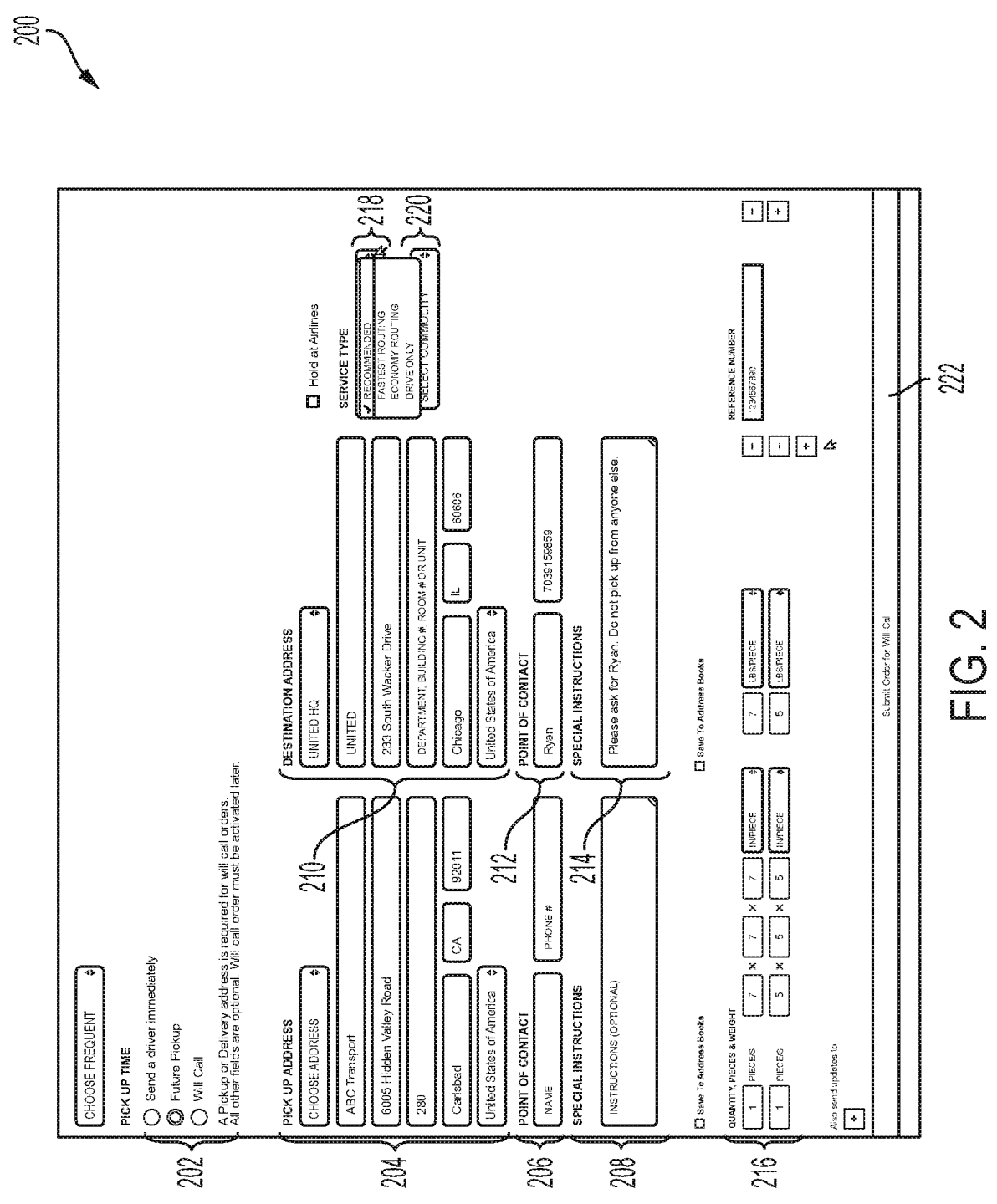
Figure 3:
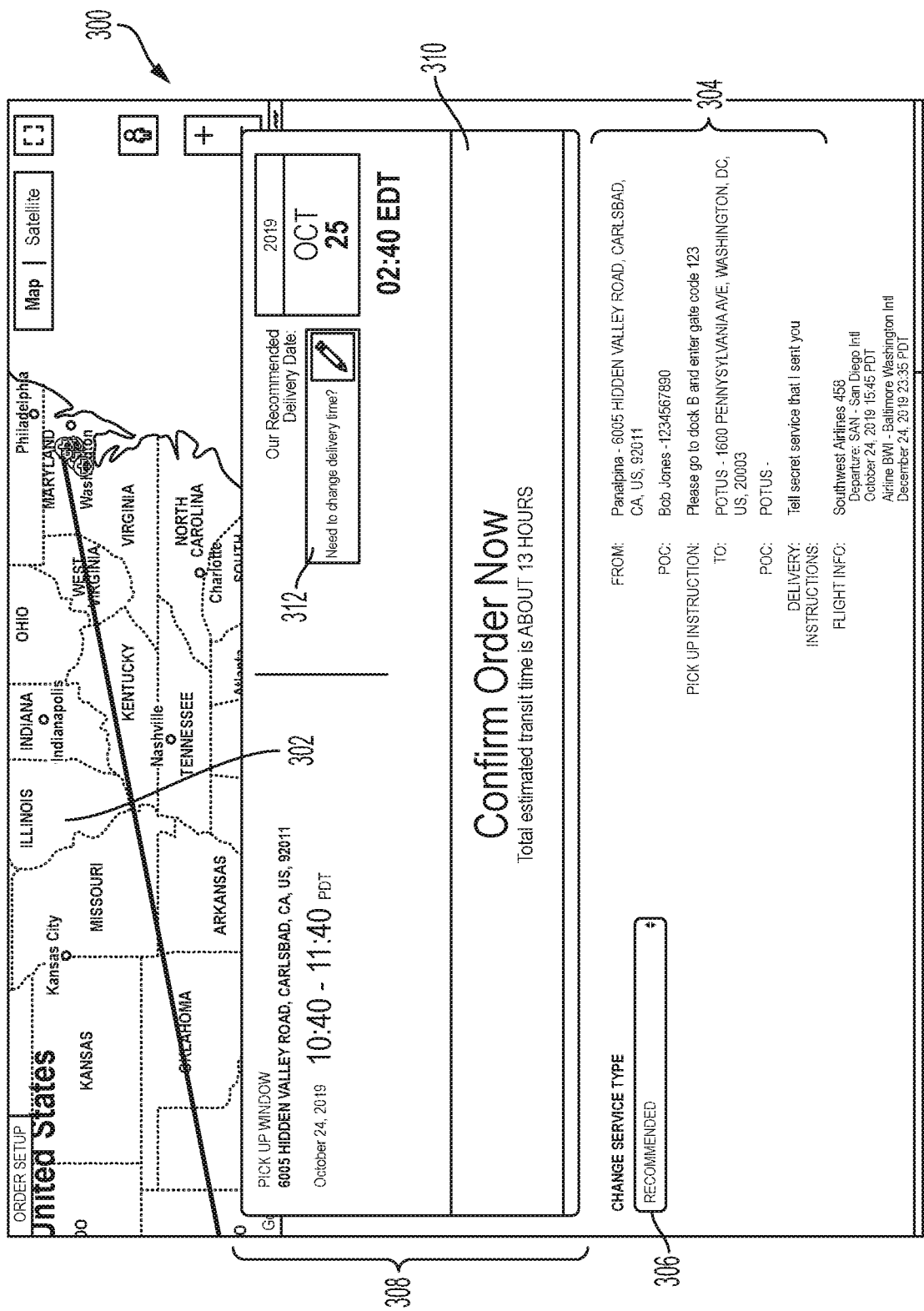
Figure 4:
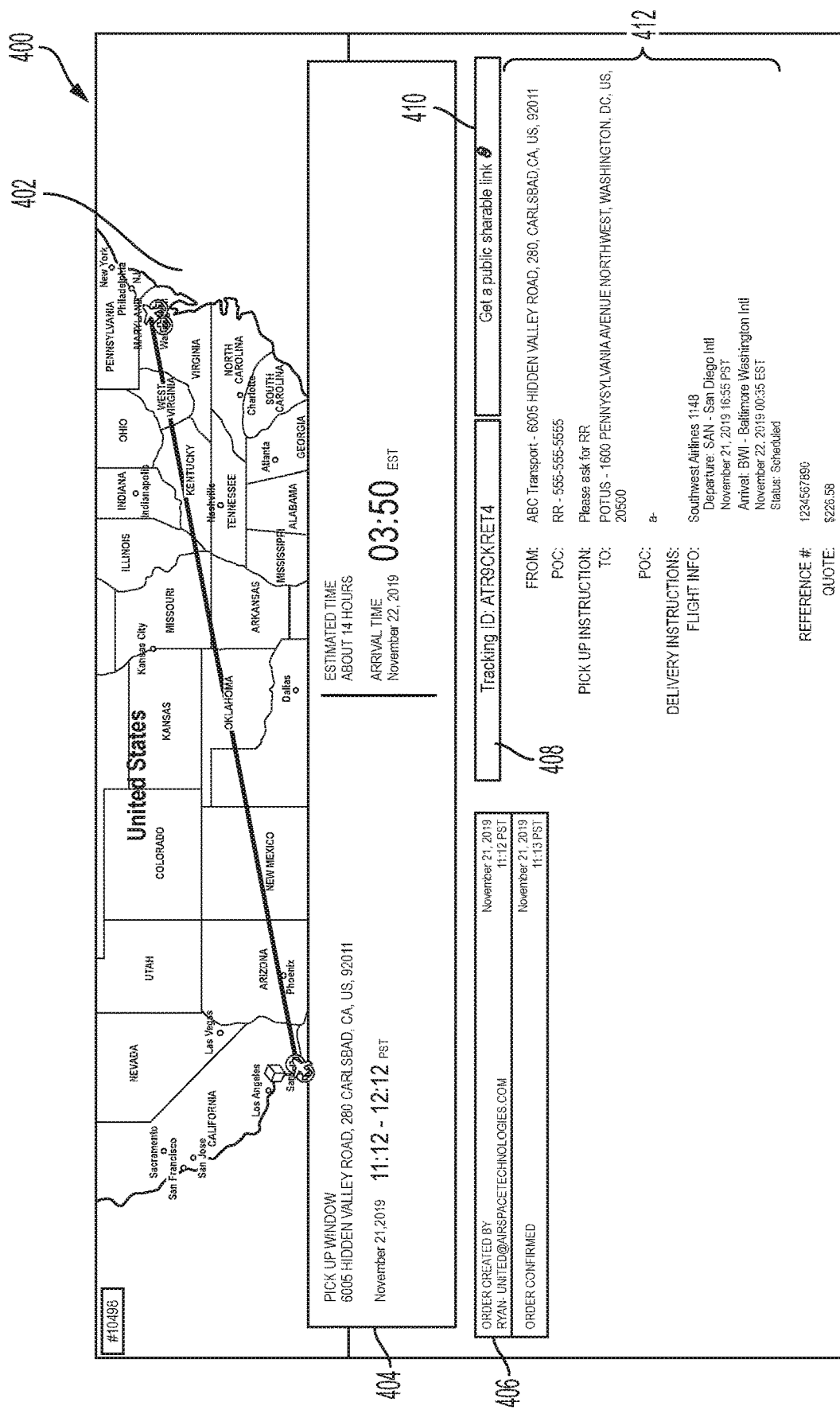

FIGS. 2-4 illustrate example interfaces 200, 300, and 400 of user request application 114 (of FIG. 1). Referring now to FIG. 2, user interface 200 includes pick up time 202, pick up address 204, pick-up point of contact (POC) 206, pick-up special instructions 208, destination address 210, destination POC 212, destination special instructions 214, good information 216, service type 218, commodity type 220, and/or submit order button 222.

In some embodiments, as illustrated, pick up time 202 may include a plurality of options, such as "Send a driver immediately," "Future Pickup," and "Will Call." The "Send a driver immediately" option may send a transporter (e.g., driver) immediately upon submission of a request. The "Future Pickup" option may allow a user to provide a designated time and/or date. The "Will Call" option may allow a user to provide a request that the goods be picked up by the user at the destination location.

Pick-up and destination addresses 204 and 210 provide a location for picking up and delivering the goods, respectively. Pick-up and destination POCs 206 and 212 provide an individual for contact before, during, or after transit to and/or from the pickup location and destination location, respectively. Pick-up and destination special instructions 208 and 214 provide instructions for transporting particular goods with respect to their state (e.g., fragile or perishable), unique circumstances (e.g., deadline, importance), or a special case (e.g., handing of the good (e.g., upright)). Good information 216 relates to any information required for the transport of the goods. For example, as illustrated, good information 216 may relate to a number of pieces of a particular good having certain dimensions, weight, and/or user reference numbers. Service type 218 provides predetermined options for the transporting of the goods. For example, as shown, the options may be a fastest route, a drive-only route, an economy route, and a recommended route, as will be described in more detail below.

Referring now to FIG. 3, upon submission of a request for transport of goods via user interface 200's submit button 222 (of FIG. 2), user interface 300 may be presented. User interface 300 includes map 302, user request summary 304, change service type 306, route summary 308, and/or confirmation button 310. Map 302 presents the route. User request summary 304 includes some or all of the user information provided on user interface 300. Change service type 306 permits changes to service type 218 (of FIG. 2). Route summary 308 includes a pickup date/time and/or a delivery date/time. The pickup and/or delivery dates and/or times may be a range of dates and/or times. Route summary 308 also includes a change delivery date or time option 312.

Referring now to FIG. 4, after confirmation of user request via user interface 300's confirmation button 310 (of FIG. 3), user interface 400 may be presented. User interface 400 includes live map 402, pickup and destination window 404, status updater 406, tracking identification number 408, sharable link 410, and/or detail summary 412. Live map 402 provides a current (live) transport location of goods with respect to a geographical map. Pickup and destination window 404 provides a pertinent date, time, and address for pickup and delivery of goods. Status updater 406 provides an update on a status of the transport of goods. As such, status updater 406 may provide a list of current and/or past events, which may be a result of reaching a designated geographical location, a specified time, a predefined event (e.g., scanning a package at intermediate location). Tracking identification number 408 is a random combination of numbers and letters automatically generated upon submission of an order. Tracking identification number 408 may be unique to a user request. Sharable link 410 allows users to copy or share access to user interface 400. For example, where users are transportation companies, sharable link 410 may be provided to their users whose goods are transported. Detail summary 412 includes some or all of the information provided via user interface 300 (of FIG. 3).

Referring to FIG. 1, central server 102 further includes route generator module 116 to generate a preferred route from a pickup location to a destination location. In some embodiments, upon user request application 114 receiving a user request, user request application 114 sends the request to the route generator module 116, which requests the pre-generated graph, as discussed above, from geographical data module 112. Route generator module 116 then translates the pre-generated graph to identify the user request's pickup and destination locations. In some embodiments, route generator module 116 also identifies possible intermediate locations corresponding to the pickup and destination locations based on the geographical data.

As discussed above, the possible intermediate locations relate to locations for products to change carriers and/or modes of transportation to arrive at the destination location. In some embodiments, the possible intermediate locations corresponding to the pickup and destination locations provided in the request are less than all possible intermediate locations provided in the pre-generated graph. In some embodiments, route generator module 116 can also identify transit information for the pickup location, each possible intermediate location, and the destination location, as described above.

Further, route generator module 116 also identify possible routes from the pickup location to each possible intermediate location, from the pickup location to the destination location, from each possible intermediate location to another possible intermediate location, and/or from each possible intermediate location to the destination location. In some embodiments, route generator module 116 may identify multiple possible routes from one location to another location. For example, route generator module 116 may identify multiple routes from the pickup location to a possible intermediate location.

Route generator module 116 may generate a subgraph from the pre-generated graph based on the pickup location, the destination location, the possible intermediate locations, and/or the possible routes. In some embodiments, route generator module 116 may generate the possible routes after generating the subgraph. In some embodiments, route generator module 116 may generate the subgraph with the possible routes.

Figure 5:
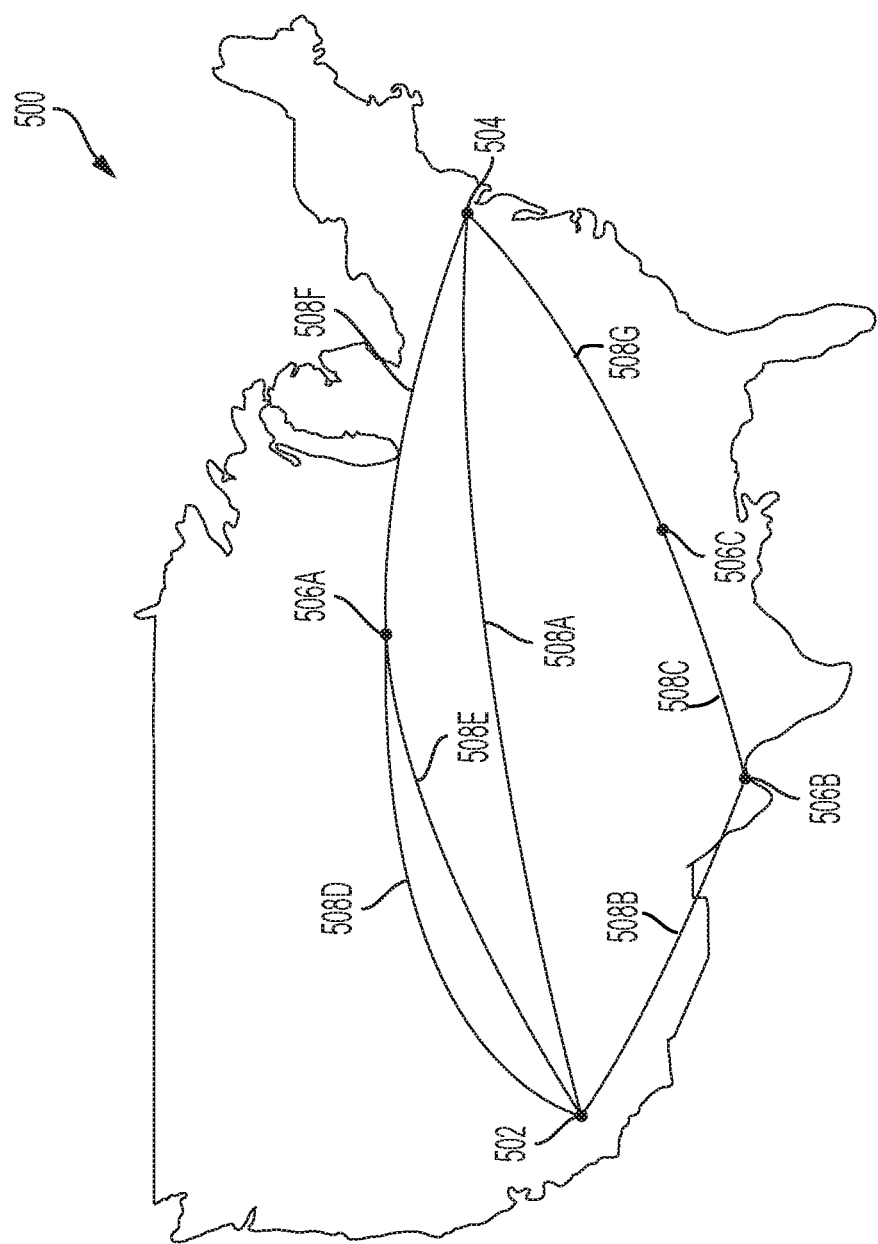
FIG. 5 is an example transportation graph generated by a route generator module, according to some embodiments.

FIG. 5 is an example transportation graph 500 for the transport of goods from pickup location 502 to destination location 504. In some embodiments, transportation graph 500 is the pre-generated graph received from geographical data module 112 (of FIG. 1). In some embodiments, transportation graph 500 is a subgraph of the pre-generated graph.

Further, as discussed above, in some embodiments, transportation graph 500 may include any combination of possible intermediate locations 506A-C. For example, in some embodiments, transportation graph 500 may include a single possible intermediate location 506A. Further, in some embodiments, transportation graph 500 may include multiple possible intermediate locations 506B and 506C.

Accordingly, in some embodiments, transportation graph 500 may include possible transportation segments 508A-G relating to the possible routes from starting location 502 to destination location 504, from starting location 502 to each possible intermediate location 506A-C, from each intermediate location 506A-C to another possible intermediate location 506A-C, and from each intermediate location 506A-C to destination location 504. In some embodiments, transportation graph 500 may include a single possible transportation segment 508A and 508B from pickup location 502 to destination location 504, and a single possible transportation segment 508B from pickup location 502 to possible intermediate location 506B or destination location 504. Further, in some embodiments, transportation graph 500 may also include a single possible transportation segment 508C from one possible intermediate location 506B to another possible intermediate location 506C. Along these lines, in some embodiments, transportation graph 500 may also include multiple possible transportation segments 508D and 508E from pickup location 502 to possible intermediate location 506A. Further, transportation graph 500 includes a possible transportation segment 508F from possible intermediate location 506A to destination location 504, and also includes a possible tranpsortation segment 508G from possible intermediate location 506C to destination location 504.

As described above, pickup location 502, possible intermediate locations 506A-C, and destination location 504 may relate to the same or different modes of transportation locations (e.g., airports, train stations, trucking stations, etc.). Accordingly, possible transportation segments 508A-G may relate to the same or different modes of transportation (e.g., vehicle, airplane, train, waterway, etc.). For example, possible transportation segments 508D and 508E—from pickup location 502 to possible intermediate location 506A—may relate to the same mode of transportation (e.g., airplane). Alternatively, possible transportation segment 508D may relate to one mode of transportation (e.g., vehicle), while possible transportation segment 508E may relate to another mode of transportation (e.g., airplane). The same may apply from pickup location 502 to destination location 504 and from one possible intermediate location 506B to another possible intermediate location 506C. As such, a complete route from pickup location 502 to destination location 504, with or without intermediate locations 506A-C, may utilize the same or different modes of transportation.

As described above, after generating the subgraph from the pre-generated graph, route generator module 116 (of FIG. 1) also receives transport data relating to the pickup location 502, destination location 504, each possible intermediate locations 506A-C, and possible transportation segments 508A-G from transporter module 118 (of FIG. 1). In some embodiments, route generator module 116 may be in communication with transporter module 118 to determine one or more transformation edges for each of pickup location 502, destination location 504, and each possible intermediate location 506A-C. Route generate module 116 may associate the transformation edges to the pickup location 502, destination location 504, and/or each possible intermediate location 506A-C.

Figure 6:
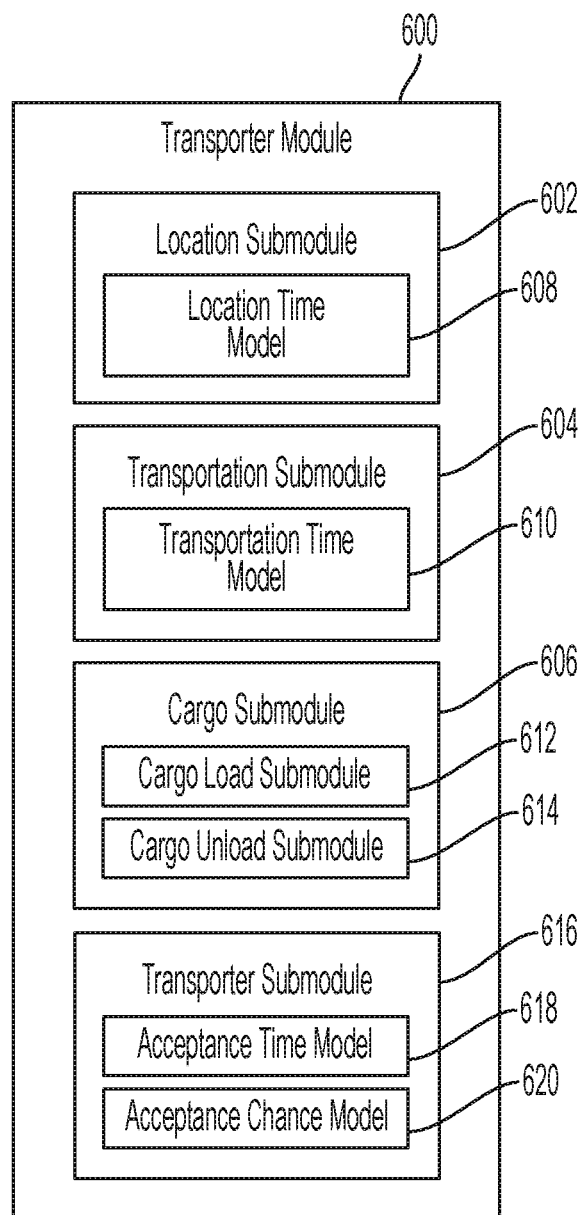
FIG. 6 is a block diagram of an example transport module, according to some embodiments.

FIG. 6 illustrates an example transporter module 600 including location submodule 602, transportation submodule 604, and cargo submodule 606. As will be described in more detail below, location submodule 602 can provide a tendering edge corresponding to an actual tendering time at each of pickup location 502, destination location 504, and each possible intermediate location 506A-C (of FIG. 5). Transportation submodule 604 can provide a transportation edge corresponding to an actual transport time or actual transport cost for each possible route from each of pickup location 502, destination location 504, and each possible intermediate location 506A-C. Cargo submodule 606 can provide a cargo edge providing a load or unload time of the good at each of pickup location 502, destination location 504, and each possible intermediate location 506A-C. Location submodule 602 determines an amount of time for a particular or average transporter to perform tendering good actions at the pickup location, each possible intermediate location, and the destination location ("actual tender time"). Tendering good actions at pickup locations relate to transporters arriving at the pickup location, receiving the goods, and returning to their mode of transportation. Likewise, tendering good actions at the intermediate and destination locations relate to arriving at the intermediate or destination locations and tendering the goods.

For example, in some embodiments, for determining the actual tender time at the pickup location, location submodule 602 may determine an aggregate amount of time for a particular transporter to park their vehicle at the pickup location (e.g., hospital), walk a particular place of the pickup location (e.g., a lab), receive the goods (e.g., scanning and signing for the packages of goods), and return to their vehicle. Likewise, for determining the actual tender time at an intermediate location, location submodule 602 may determine an aggregate amount of time for a particular transporter to park their vehicle at the intermediate location (e.g., airport), walk to a tender location of the intermediate location (e.g., cargo window), and tender the goods (e.g., wait in line and fill out the appropriate paperwork). Similarly, for determining the actual tender time at the destination location, location submodule 602 may determine an aggregate amount of time for a particular transporter to park their vehicle at the intermediate location (e.g., airport), walk to the tender location (e.g., a different hospital), walk a particular place of the pickup location (e.g., a surgery center), and provide the goods (e.g., receiving a signature).

Along these lines, in some embodiments, location submodule 602 includes location time model 608 to predict the actual tender time at the pickup location, each possible intermediate location, and the destination location. In some embodiments, location time model 608 may be a machine-learning model trained on historical tender times for known pickup, intermediate, and destination locations and known transporters. In some embodiments, location time model 608 may consider that different pickup, intermediate, and destination locations have different processing times based on, for example, size, wait time, and processing requirements. Along these lines, location time model 608 may consider that different transporters take different tender times to at the pickup, intermediate, and destination locations. For example, some transporters may walk to and from a location quickly, whereas other transporters may do so slowly.

Further, in some embodiments, for determining the actual tendering time, location time model 608 considers the current waiting times of the pickup, intermediate, and/or destination locations for receiving, tendering, and/or delivering the goods, respectively. Accordingly, location time model 608 may increase any previously determined transport time by a waiting time for tendering the goods. Also, in some embodiments, location time model 608 may predict the amount of time for new pickup/intermediate/destination locations (e.g., where transporters have not previously picked up or delivered goods). In doing so, location time model 608 may consider publically known data of the new pickup/intermediate/destination location and transporters' historical times for known pickup/destination locations. Publically known data on the new pickup/destination location may include an average number of individuals (e.g., at various times throughout the day) and a size of the location.

Transportation submodule 604 determines an actual transport time or an actual cost for a particular or average transporter to transport the goods from one location to another location ("actual transport time" or "actual transport cost"). The actual transport time and/or actual transport cost may depend on a mode of transportation (e.g., train, car, and airplane), current transport data (e.g., available routes and current traffic), and transporter's historical transport data (e.g., average miles per hour and an average amount of travel time). In some embodiments, the actual transport time and/or the actual transport cost may be received from transporter provider 104 (of FIG. 1). In some embodiments, transportation submodule 604 may include a transportation time or cost model 610 to predict the actual transport time or the actual transport cost. Transport time or cost model 610 may be a machine-learning model trained on previously utilized transport data (e.g., used routes, traffic for particular routes, an average speed, and an average amount of travel time) for a particular or average transporter utilizing a particular mode of transportation.

Cargo submodule 606 determines an amount of time for loading or unloading goods at the pickup location, each possible intermediate location, and the destination location ("actual cargo time"). In some embodiments, cargo submodule 606 includes cargo load submodule 612 and cargo unload submodule 614. Cargo load submodule 612 determines an amount of time for placing and loading goods on a method of transportation upon receipt from an intermediate location ("actual cargo load time"). For example, upon tendering a particular package to an airport, cargo load submodule 612 determines the amount of time for the airport to place the package on the flight. In some embodiments, the cargo load time may be the method of transportation's cutoff time for receiving packages (e.g., 1 hour before takeoff). In some embodiments, the cargo load time may be based on the cutoff time, the departure time, and the cargo load time. Also, the cargo load time may be further based on a cargo open and closed time provided by the method of transportation (e.g., 6:00 AM-12:00 AM).

To determine the actual cargo load time, cargo load submodule 612 receives the cutoff time, departure time, and/or cargo open and closed time from transporter provider 104 of FIG. 1 (e.g., American Airlines, United Airlines, etc.) or a transportation agency (e.g., airport, train station, etc.). Accordingly, cargo load submodule 612 may update the cargo load time based on feedback by the transporter provider 104 (of FIG. 1) and the transportation agency. For example, if a flight is delayed an hour, cargo load submodule 612 will move the cutoff time and departure time back an hour.

Cargo unload submodule 614 determines an amount of time for unloading the goods from a method of transportation ("actual cargo unload time"). Like cargo load submodule 612, cargo unload submodule 614 receives the cargo arrival time, the cargo unload open time, the cargo unload close time, and/or a transportation agency (e.g., airport, train station, etc.) from transporter provider 104 (e.g., American Airlines, United Airlines, etc.). Accordingly, cargo unload submodule 614 may update the actual cargo unload time based on feedback by the transporter provider 104 (of FIG. 1) and the transportation agency.

Referring to FIG. 1, in some embodiments, after associating transporter module 118's transport data with one or more edges of transportation graph 500's pickup location 502, destination location 504, possible intermediate locations 506A-C, and possible transportation segments 508A-G (of FIG. 5) (e.g., a tendering edge, a transportation edge, and/or a cargo edge), route generator module 116 may request user preferences and/or a user value of time from user profile module, which may be unique to a user seeking transport of the good. Route generator module 116 may then determine an optimal route based on user-selected service type 218 (of FIG. 2). As discussed above, user-selected service type 218 may be one of a fastest route, a drive-only route, an economy route, and/or a recommended route.

In some embodiments, where user-selected service type 218 is the fastest route, route generator module 116 may generate a preferred route from pickup location 502 to destination location 504 (of FIG. 5) based on the least amount of time and/or on the user preference. Route generator module 116 may select the preferred route irrespective of the actual cost for transporting the good. For instance, route generator module 116 can select segment 508A to route a good from pickup location 502 to destination location 504 although other segments may have a lower cost. Along these lines, if the user prefers a certain mode of transportation or carrier, route generator module 116 can select segments corresponding to the preferred mode of transportation or carrier, although other segments permit the good to arrive at destination location 504 sooner.

In some embodiments, where user-selected service type 218 is drive-only and economy route, the preferred route from pickup location 502 to destination location 504 based on the actual cost and the user preference. In some embodiments, for the recommended route, route generator module 116 generates a preferred route from pickup location 502 to destination location 504 (of FIG. 5) based on actual cost, user preference, and a likelihood of route approval. Along these lines, as illustrated above with respect to FIG. 6, the transport and location data may be in the form of time (e.g., minutes) and actual cost (e.g., dollars). Accordingly, as stated above, in some embodiments, for the drive-only, economy, and recommended routes, route generator module 116 may determine a true user cost relating to the pickup location, possible intermediate location, destination location, and/or possible transportation segments. In some embodiments, for the drive-only and economy routes, route generator module 116 may determine a cost per interval of time (e.g., 2 dollars per minute) or a time per monetary unit (e.g., 2 minutes per dollar). In some embodiments, route generator module 116 determine a cost per interval of time or a time per monetary unit based on previous user orders In some embodiments, the cost per interval of time may be (Avg$PerMin(OnOperationsOrCustomerApprovedOrders) *ApprovalWeight)+(Avg$PerMin(OnOperationsOrCustomerDisapprovedOrders)*DisapprovalWeight). In some embodiments, when the user is new, route generator module 116 may assign a predetermined cost per interval of time (e.g., 2 dollars per minute) or a predetermined time per monetary unit (e.g., 2 minutes per dollar) for the user.

As such, for the economy and drive-only routes, where there is an actual cost (e.g., dollars) associated with possible intermediate locations 506A-C and possible transportation segments 508A-G (of FIG. 5), the client cost=actual cost× ('cost per interval of time' or 'time per monetary unit'). For example, route generator module 116 may consider a first and second possible route. The first possible route comprises a flight from pickup location 502 to destination location 504 ("possible transportation segment 508A"). The second possible route comprises a drive from pickup location 502 to intermediate location 506B ("possible transportation segment 508B"), a flight from intermediate location 506B to intermediate location 506C ("possible transportation segment 508C"), and a drive from intermediate location 506C to destination location 504 ("possible transportation segment 508G"). Possible segments 508A-C and G may have an actual cost of $150, $10, $100, and $10, respectively. Further, the waiting times at the intermediate locations 506B and 506C may each be 40 minutes. Accordingly, assuming that minute per dollar is 2, route generator module 116 may determine that the total client cost for the first possible route is 300 minutes ($150×2 'minutes per dollar') and that the total client cost for the second possible route is 320 minutes (($10×2 'minutes per dollar')+(40 minutes)+($100×2 'minutes per dollar')+(40 minutes)+($10×2 'minutes per dollar')). Accordingly, although the first possible route has an actual cost more than the second possible route (i.e., $150 vs. $120), route generator module 116 will select the first possible route. In some embodiments, for possible intermediate locations 506A-C and possible transportation segments 508A-G (of FIG. 5) having an associated time but not the actual cost, the user cost may be equal to weight time×(1/'handler approval'%). For possible intermediate locations 506A-C and possible transportation segments 508A-G (of FIG. 5) having an associated time and actual cost, the user cost may be equal to ((weight time+(actual cost×('cost per interval of time' or 'time per monetary unit')))×(1/'handler approval'%)).

Further, for the recommended route, route generator module 116 may also consider a likelihood of approval of possible transportation segments 508A-G (of FIG. 5) by a handler ("handler approval"). As will be described in more detail, handler approval is required for each route. Accordingly, upon determination of a route, the handler may then review the route and either approve or deny all of it or segments of it. Thus, if the route is approved or denied, all segments in the route are marked "good" or "bad" However, if changed, the unchanged segments are marked "good" and the changed segments are marked "bad." For example, if a user has previously submitted user requests and a particular segment has historically been approved for the user, the path search algorithm (e.g., A*) will likely prefer the particular segment. However, if a particular user has not previously submitted user requests, the likelihood of approval for a particular segment for the particular user may be based on other users. For example, if the particular user is requesting transport of a good similar to other transporters where the particular segment was approved, the likelihood of approval for the particular segment may be high. However, if the particular user is requesting transport of a good different from other transporters where the particular segment was not approved, the likelihood approval for the particular segment may be low. By operating in such a fashion, route generator module 116 may accurately consider different possible legs and routes that have different times and costs as preferred by the user.

After deriving the transit cost for each segment of the path, irrespective of user-selected service type 218 (of FIG. 2), route generator module 116 may utilize a path-finding algorithm to find a preferred route—having one or more segments—among the plurality of possible routes having a lowest cost (e.g., transit cost). In some embodiments, the path-finding algorithm may be A*, although other path-finding algorithms may be utilized.

Additionally, route generator module 116 may receive updates from transporter provider 104 on the delay of scheduled transports (e.g., flights, trains, buses). Likewise, route generator module 116 may receive updates from geographical provider 106 relating to drive-only transportation (e.g., traffic, road closure, accidents). In some embodiments, route generator module 116 may receive the updates in real-time. Accordingly, route generator module 116 may update the preferred route based on the service type 218 (of FIG. 2) (e.g., fastest route) and/or the user-selected delivery date and time (e.g., Mar. 16, 2020, at 2:00 PM EST). Route generator module 116 may then utilize the path-finding algorithm to see if a new preferred path exists.

Figure 7:
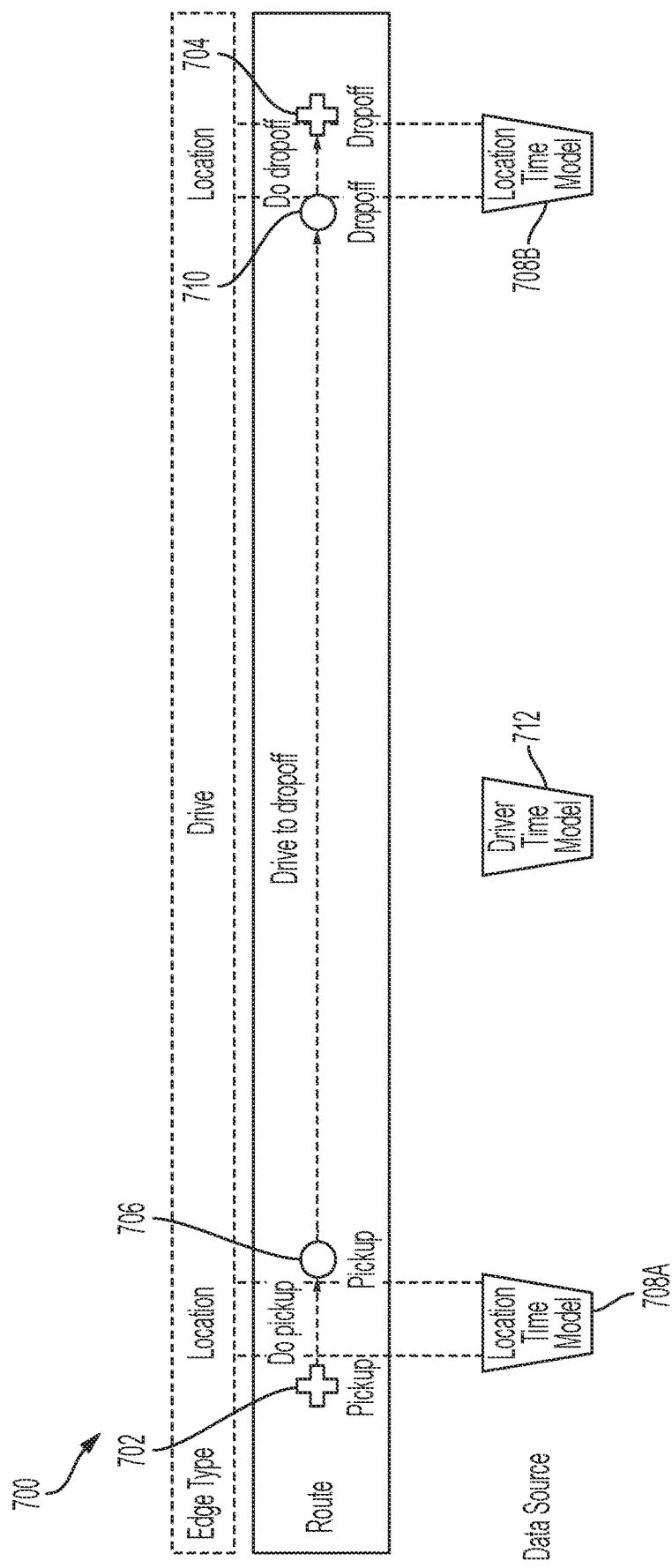
FIG. 7 is an example drive-only route constructed by a route generator module in communication with a transport module, according to some embodiments.
Figure 8:
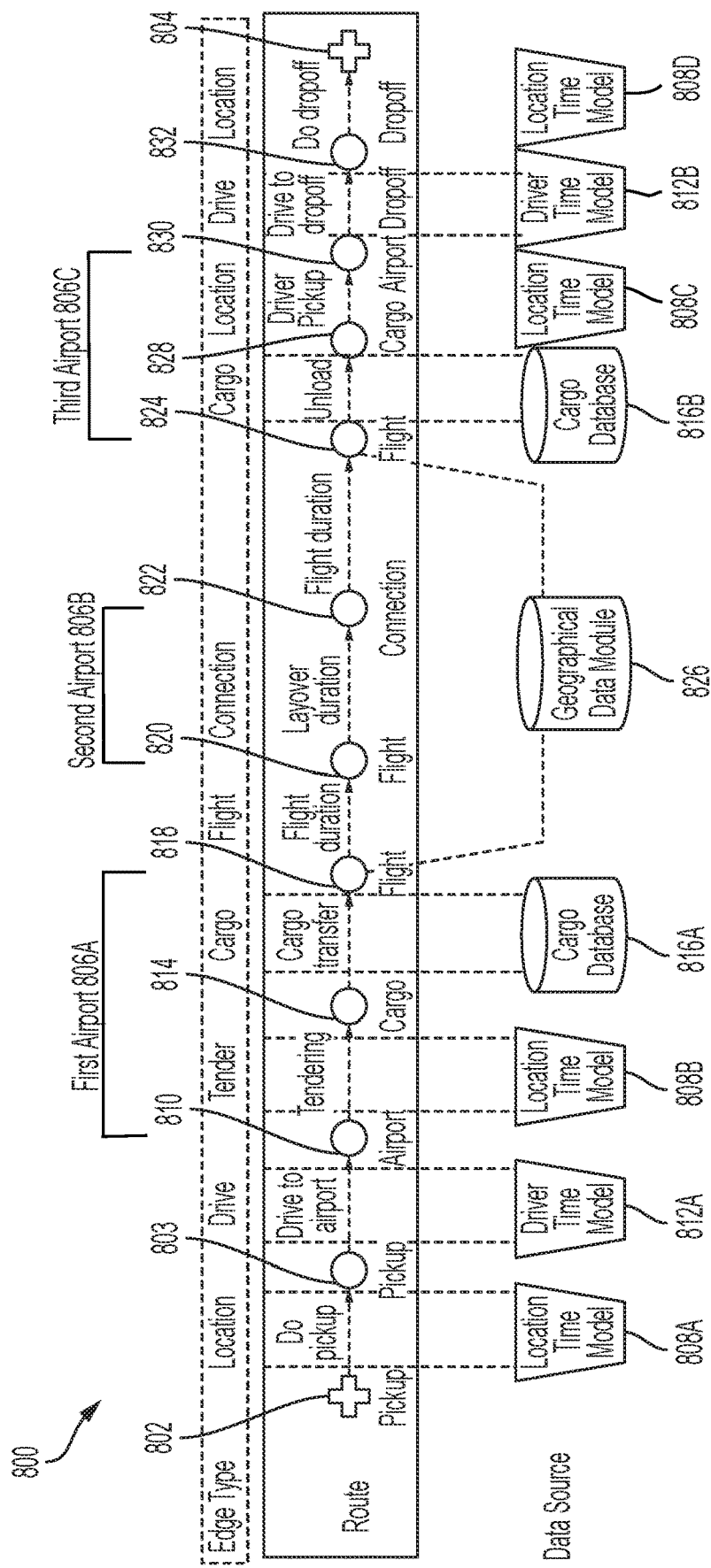
FIG. 8 is an example route having a connection as constructed by a route generator module in communication with a transport module, according to some embodiments.

FIGS. 7 and 8 are example routes 700 and 800 from pickup location 702 and 802, respectively, to destination location 704 and 804, respectively. Example routes 700 and 800 are generated from geographical data module 112 and transporter module 118 (of FIG. 1). As described above, in some embodiments, as illustrated in FIG. 6, transporter module 600 includes transportation submodule 604, location submodule 602, and cargo submodule 606. Likewise, as also described above, in some embodiments, transportation submodule 604 and location submodule 602 includes transportation time model 610 and location time model 608, respectively.

FIG. 7 is an example drive-only route 700 from pickup location 702 to destination location 704. Location time models 708A and 708B determine a tendering time at pickup location 702 and at destination location 704, respectively. Driver time model 712, which is an example of a transportation time model, determines a travel time from pickup location 702 to destination location 704. As such, a transporter arrives at pickup location 702 and, after receiving goods, departs at time 706. Thereafter, the transporter arrives at destination location 704 at time point 710, and, after second amount of time, tenders goods.

FIG. 8 is an example of route 800 from pickup location 802 to destination location 804 via three intermediate locations: a first airport 806A, a second airport 806B, and a third airport 806C. Location time model 808A determines a tendering time at pickup location 802, location time model 808B determines a tendering time at the first airport 806A, location time model 808C determines a tendering time at the third airport 806C, and location time model 808D determines a tendering time at destination location 804. Specifically, location time model 808A determines a time to do a pickup at pickup location 802, location time model 808B determines a time to tender the goods to the first airport 806A, location time model 808C determines a time to remove the goods from cargo and ready them for pickup from the airport 806C, and location time model 808D determines a time required for the drop at the destination location 804. Cargo database 816A determines a time to transfer the goods to cargo at the first airport 806A, while cargo database 816B determines the flight a time for unloading at the third airport 816B. Geographical data model 826 determines the flight duration form the first airport 806A to the second airport 806B, the flight duration from the second airport 806B to the third airport 806C, and the time idle (i.e., layover duration) at the second airport 806B. Driver time model 812A and driver time model 812B are examples of transportation time models. Driver time model 812A determines a travel time from pickup location 802 to the first airport 806A, while driver time model 812B determines a travel time from the third airport 806C to destination location 804.

Accordingly, a transporter arrives at pickup location 802, receives goods, and departs at time point 803. The transporter then arrives at first intermediate location 806A (e.g., first airport) at time point 810. The goods are tendered until in time point 814. The goods are then transferred via cargo until time point 818 so that they are ready for transport to second intermediate location 806B (e.g., second airport). Thereafter, the goods depart from first intermediate location 806A (e.g., first airport) to second intermediate location 806B (e.g., second airport) at time point 820.

After arriving at second intermediate location 806B (e.g., second airport), route 800 has a layover. As such, the goods depart from second intermediate location 806B (e.g., second airport) at time point 822, and arrive at third intermediate location 806C (e.g., third airport) at time point 824. Upon arriving at third intermediate location 806C (e.g., third airport), goods are transferred via cargo until time point 828 so that they are ready for pickup by a transporter for delivery to destination location 804. The transporter thus arrives at the third intermediate location 806C, receives the goods, and departs to the destination location 804 at time point 830. After arrival at destination location 804 at time point 832, transporter drops off the goods to an authorized individual.

Referring back to FIG. 1, during and/or after the appropriate route from a pickup location to a destination location, transporter application 120 receives requests from transporters—via user devices 108A-C—for transporting goods from a pickup location to an intermediate location (e.g., an airport) or a destination location. As such, transporter application 120 may provide instructions to transporters via user devices 108A-C during their route, as will be discussed in more detail below. Accordingly, after the submission of an order of goods as described above with respect to FIGS. 1-4, transporter application 120 communicates with transporter module 118 to identify an appropriate transporter for transporting goods from the pickup location to the intermediate or destination locations.

Figure 9:
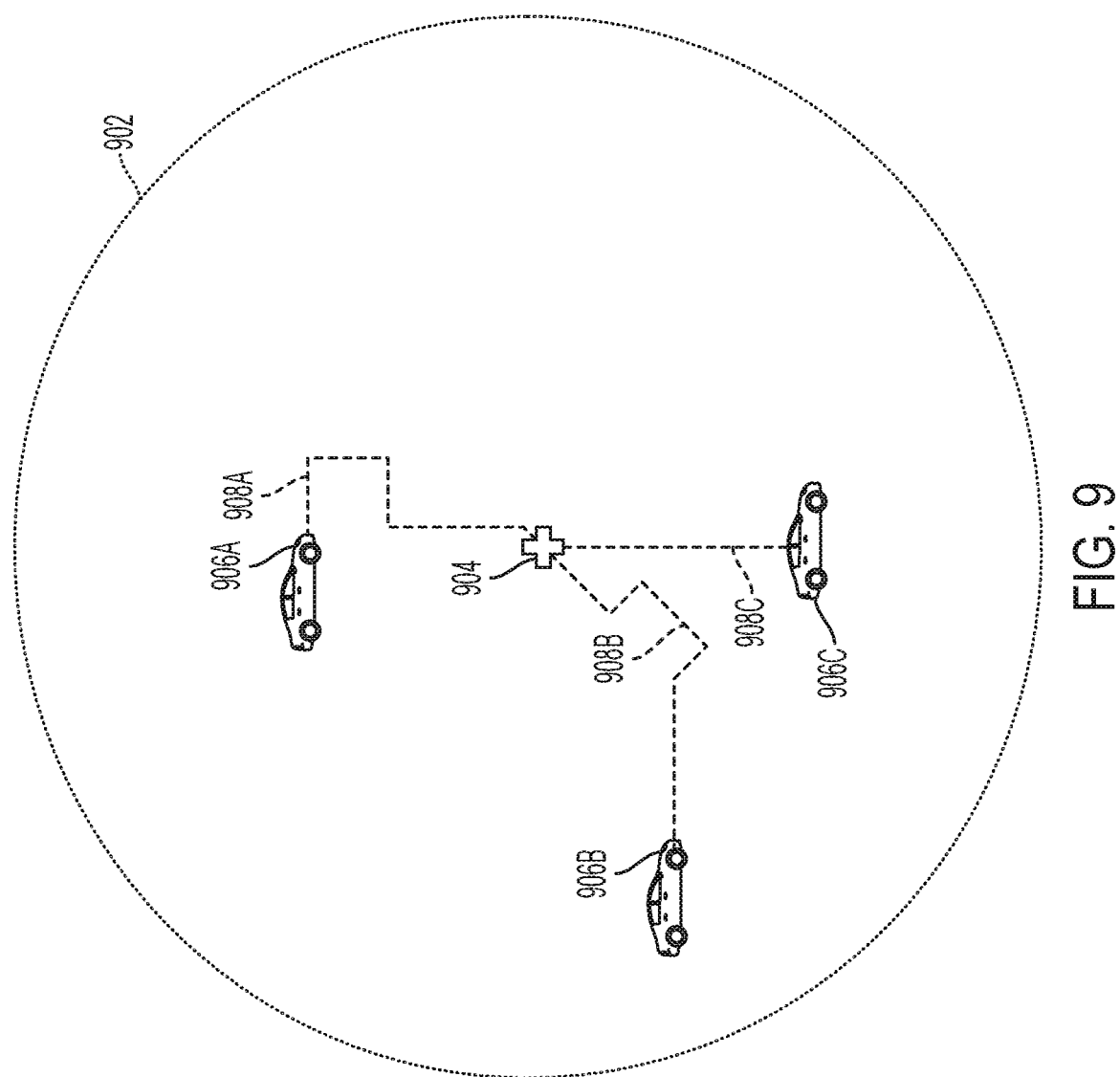
FIG. 9 is example transporters identified by a transporter application, according to some embodiments.

Referring now to FIG. 6, to identify the appropriate transporter, transporter module 600 further includes transporter submodule 616. After users submit orders, transporter submodule 616 identifies available transporters within a predetermined distance from the pickup location or intermediate, for example, by tracking their location through user devices 108A-C (of FIG. 1). The available transporters may be assigned to another job. In other words, the available transporters may have picked up or be scheduled to pick up goods for another job from a different or same pickup location. Likewise, the available transporters may be scheduled to transport goods for another to a different or same intermediate or destination location. FIG. 9 illustrates example available transporters 906A-C within predetermined distance 902 from pickup location (or intermediate location) 904.

Referring to FIG. 6, transporter submodule 616 may then determine if the number of identified available transporter meets or exceeds a predetermined number of available transporters. Transporters may relate to an individual or a carrier. In some embodiments, if the number of identified available transporters does not meet or exceed a predetermined number of drivers, transporter submodule 616 may expand the searchable range by a predetermined distance. Alternatively, if the number of identified available transporters does not meet or exceed a predetermined number of available transporters, transporter submodule 616 may expand the searchable range until the predetermined number of available transporters is met. The predetermined distance may be 5 miles, 10 miles, 19 miles, or 50 miles, to provide a few examples. The predetermined number of available transporters may be 5, 10, 15, or 20, to provide a few examples.

Transporter submodule 616 may then identify eligible transporters for transporting the goods from the available transporters. As discussed above, the goods may require special handling by the transporters. For example, the goods may be fragile (e.g., glass) or an organ (e.g., a heart). Further, the goods may be heavy (e.g., furniture) or need refrigeration (e.g., produce and human tissue) and thus require special transportation. Likewise, the goods may be of a certain size (e.g., a car) and thus need a suitable size carrier. As such, transporter submodule 616 may ensure that the available transporters have the appropriate certifications and/or are of the appropriate kind of carriers (e.g., a vehicle or a truck). Thus, transporter submodule 616 may filter through the available transporters for eligible transporters, for example, those that have the proper certification and/or are of the appropriate type of carriers. Transporter submodule 616 may then determine if the number of eligible transporters meets or exceed a predetermined number of eligible transporters. If not, as discussed above, the searchable range is expanded by a predetermined distance or until the predetermined number of eligible transporters is met.

Transporter submodule 616 may then determine if the eligible transporters are solicitable. Eligible transporters are solicitable if they are able to transport the good to the pickup location, intermediate location, or destination location by a time specified by route generator module 116 (of FIG. 1) or a user in the request. Further, as mentioned above, eligible transporters may include those transporting or scheduled to transport other orders. Accordingly, these eligible transporters are solicitable if they are, or will be, going to the same pickup location, intermediate location, or destination location. Further, eligible transporters assigned other jobs are solicitable if they can complete transport all jobs by their specified times.

Accordingly, to identify solicitable transporters, transporter submodule 616 determines an Estimate Completion Time (ECT) for completing transport of all jobs for each eligible transporter. As such, for an eligible transporter not transporting any other orders, transporter submodule 616 determines an ECT for a transporter to pick up and deliver the solicited order. For an eligible transporter transporting other orders, transporter submodule 616 determines an ECT for a transporter to pick up the orders from the pickup location and deliver the orders to the intermediate and destination locations in any sequence. To determine the ECT, transporter module 600 can utilize a trained transporter model.

To determine the ECT, transporter submodule 616 can utilize a trained transporter model. In some embodiments, the trained transporter model can include transportation submodule 604's transportation time model 610 and/or location submodule 602's location time model 608. As discussed above, transportation time model 610 determines an estimated amount of time for transporters to transport the goods to the pickup and/or intermediate locations ("an estimated transport time"). Accordingly, as illustrated in FIG. 9, transportation time model 610 (of FIG. 6) may determine particular routes 908A-C for transporters 906A-C to travel to pickup location or intermediate location 906. Location time model 608 determines an estimated amount of time for transporters to tender the goods at pickup and/or intermediate locations ("an estimated tender time").

In some embodiments, transporter submodule 616's trained transporter model can also include transporter acceptance time model 618 and transporter acceptance chance model 620. Transporter acceptance time model 618 predicts an estimated amount of time that it will take a transporter to accept a solicitation for a job ("an estimated transporter acceptance time"). In some embodiments, transporter acceptance time model 618 may be based on a predetermined time provided to solicited transporters (e.g., 90 seconds). In some embodiments, transporter acceptance time model 618 is based on an output provided by transporter acceptance chance model 620, which may represent a likelihood of a particular solicitable transporter accepting the job. In some embodiments, solicitation acceptance time may be equal to a predetermined solicit time×(1/a likelihood of solicitable transporter acceptance). In some embodiments, transporter acceptance chance model 620 may be trained on historical data of the particular solicitable transporter accepting previous jobs, for example, at certain hours of the day.

Therefore, the ECT may be a total of an estimated tender time, an estimated transport time, and/or an estimated solicitation acceptance time. Along these lines, where the solicitable transporter is scheduled to transport multiple jobs, transporter submodule 616 may derive the ECT for completing transport for picking up and delivering orders to the destination or intermediate locations in every possible sequence. After doing so, transporter application 120 selects the sequence of events having the least amount of time to represent the time the solicitable transporter may perform the jobs.

For example, if the solicitable transporter was previously assigned "jobA" and is currently being solicited for "jobB," transporter submodule 616 may determine an ECT for each of the following sequences—(i) picking up "jobA," picking up "jobB," delivering "jobA," and delivering "jobB," (ii) picking up "jobA," picking up "jobB," delivering "jobB," and delivering "jobA," (iii) picking up "jobA," delivering "jobA," picking up "jobB," and delivering "jobB," (iv) picking up "jobB," picking up "jobA," delivering "jobA," and delivering "jobB," (v) picking up "jobB," picking up "jobA," delivering "jobB," and delivering "jobA," and (vi) picking up "jobB," delivering "jobB," picking up "jobA," and delivering "jobA." Accordingly, if the ECT for sequences (i), (ii), (iii), (iv), (v), and (vi) is 120 minutes, 170 minutes, 130 minutes, 90 minutes, and 160 minutes, respectively, transporter application 120 may select sequence (iii) as representing the transporter for the amount of time it can complete "jobA" and "jobB."

Along these lines, to compare multiple solicitable transporters previously assigned other jobs, transporter submodule 616 may select the solicitable transporter having the shortest ECT for completing the solicited offer. For example, solicitable transporters "X" and "Y" may have been previously assigned "jobA" and "jobB," respectively, and are currently being solicited "jobC." As such, transporter submodule 616 may determine that transporter "X" 's ECT for completing "jobA" and "jobC" is 120 minutes, and that transporter "Y" 's ECT for completing "jobB" and "jobC" is 180 minutes. In some embodiments, transporter submodule 616 may determine that transporter "X"'s and "Y"'s ECT for completing "jobC" is 70 minutes and 90 minutes, respectively. Accordingly, although transporter "X"'s ECT for completing both jobs is shorter than transporter "Y"'s ECT, transporter submodule 616 may select transporter "Y" since transporter "Y" ECT for completing the transport of the solicited job—i.e., "jobC"—is shorter. In some embodiments, transporter submodule 616 may determine that transporter "X"'s and "Y"'s ECT for completing "jobA" is 120 minutes and 90 minutes, respectively. Transporter submodule 616 may also determine that the transporter "X" is to complete "jobA" then "jobB" and that transporter "Y" is to complete "jobB" then "jobA." Accordingly, although transporter "Y" is to complete "jobB" after a previously assigned order, transporter "Y" may still be selected over transporter "X."

Along these, transporter submodule 616 may consider solicitable transporters previously assigned other orders and solicitable transporters not previously assigned other orders. Transporter submodule 616 may then select the solicitable transporter having the least ECT for completing transport of the solicited job as a preferred pickup transporter. For example, transporter submodule 616 may consider transporters "A" and "B." Transporter "A" may have been previously assigned "jobA" and is being solicited for "jobB." Transporter B is only being solicited for "jobB." Accordingly, transporter submodule 616 may determine that the ECT for transporters "A" and "B" for completing solicited offer "job" is 80 minutes and 100 minutes, respectively. As such, transporter submodule 616 may select transporter "A," although it has been assigned another job (i.e., "jobA") and may deliver the other before the solicited job (i.e., "jobB").

Transporter submodule 616 may then send a request to the preferred transporter to transport the order. In some embodiments, transporter submodule 616 may wait a predetermined amount of time (e.g., 90 seconds) for acceptance. If the solicited transporter does not accept the offer, transporter submodule 616 may then restart the process to determine an appropriate transporter (i.e., identify available transporters, identify eligible transporters from the available transporters, etc.). In doing so, the transporter may be considered again for solicitation, albeit the acceptance chance model may derive a lower likelihood of accepting the job based on their lack of acceptance previously, thus being less likely to be solicited again.

Figure 10:
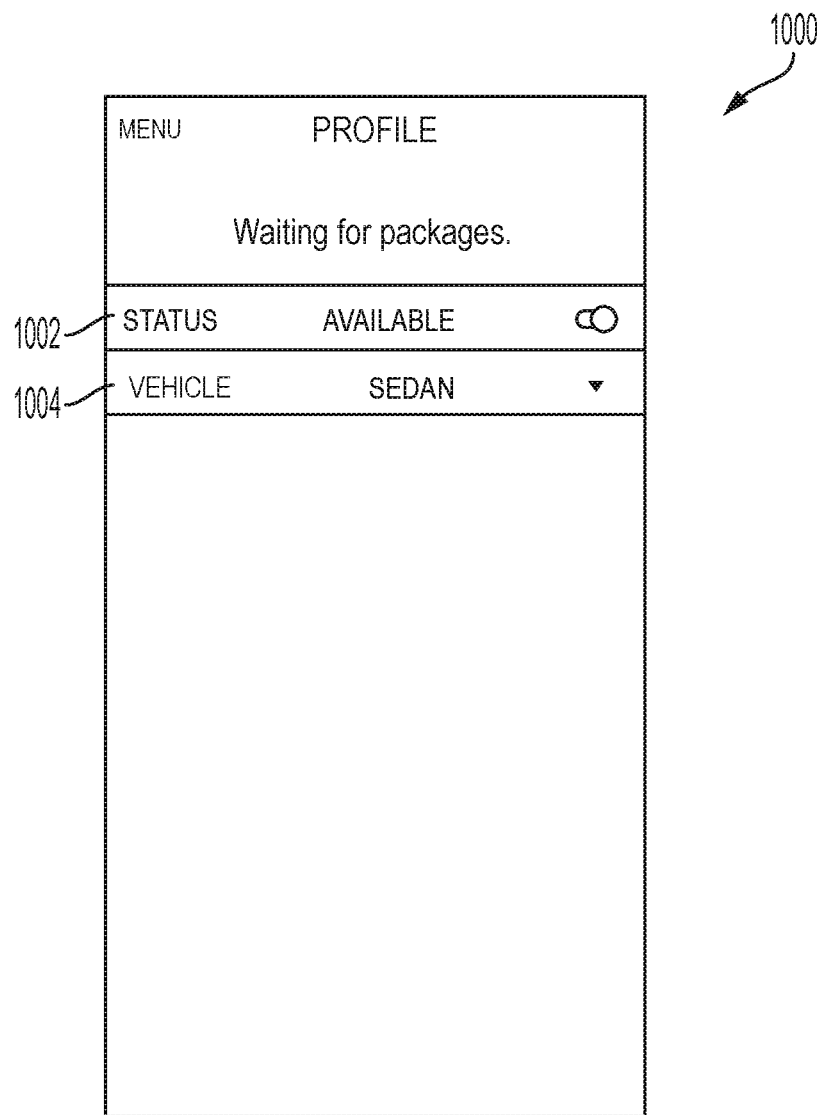
FIG. 10 is an example user interface of a transporter application when waiting for an assignment of an order, according to some embodiments.

FIGS. 10-21 illustrate example user interfaces 1000, 1100, 1200, 1300, 1400, 1500, 1600, 1700, 1800, 1900, 2000, and 2100 of a transporter application 120 (of FIG. 1), according to some embodiments. Referring now to FIG. 10, user interface 1000 may include status indicator 1002 and/or vehicle type 1004. Status indicator 1002 may permit a transporter to indicate availability for the transporting of goods. In some embodiments, status indicator 1002 may permit date and/or time for which the transporter will be available. Vehicle type 1004 may permit a transporter to provide vehicle information for which the transporter will deliver goods. The vehicle information may include a year, a make, a model, and any other type of special handling (e.g., refrigeration).

Figure 11:
FIGS. 11 and 12 are example user interfaces of a transporter application upon receipt of an assignment of an order, according to some embodiments.

Referring now to FIG. 11, upon assignment of a particular job to transport goods, user interface 1100 may be provided. User interface 1100 may receive notification 1102 of solicitation of a job. Notification 1102 includes a pickup time and/or date and an option to "view" or "dismiss" the job. If the "view" option is selected, the user approves the job. However, if the "dismiss" option is selected, the user rejects the job.

Figure 12:
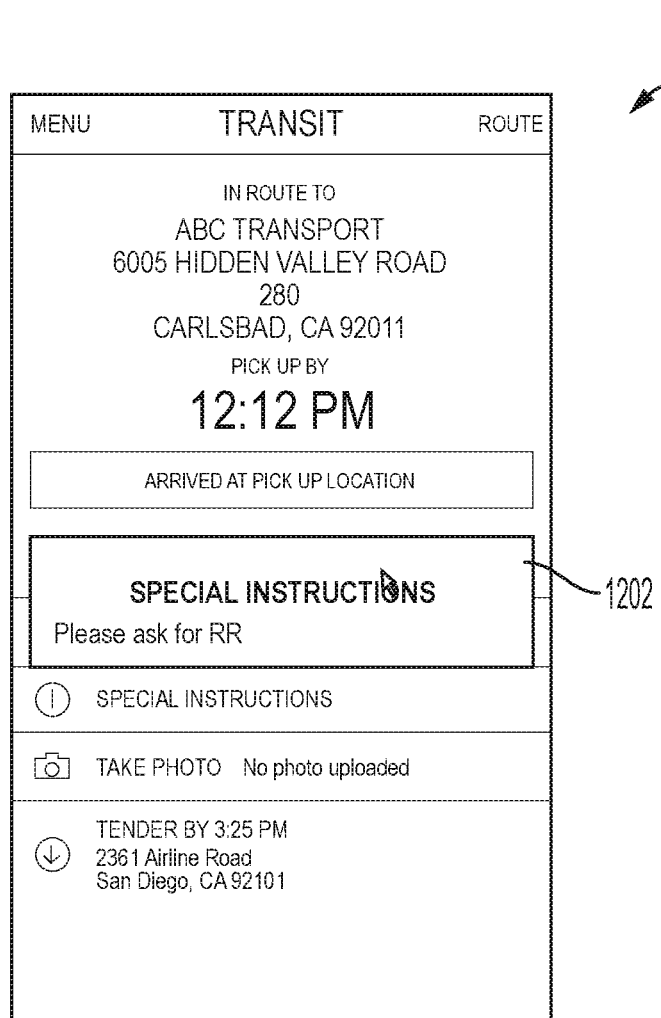
Figure 13:
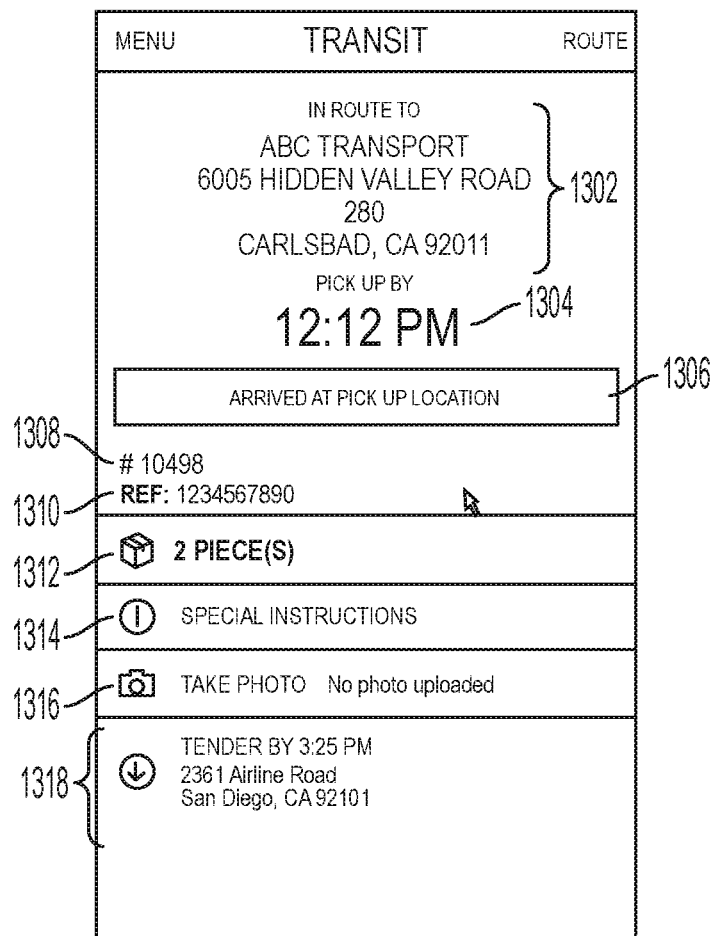
FIG. 13 is an example user interface of a transporter application for a transporter traveling to a pickup or intermediate location, according to some embodiments.

Referring now to FIGS. 12 and 13, upon viewing (or approving) a particular job, user interfaces 1200 and/or 1300 may be presented. FIG. 12 illustrates user interface 1200 including special instructions notification 1202 of the job. As illustrated, special instructions notification 1202 may be provided before viewing of the details of the job, as shown in detail in FIG. 13. As noted above, the special instructions may be provided by a user when submitting a request, or, as will be discussed in more detail below, by an authorized user in processing the request. This confirms that the transporter views the special instructions.

FIG. 13 illustrates user interface 1300 providing details of the job for the transporter. User interface 1300 includes pickup location 1302, pickup time 1304, arrival button 1306, order number 1308, reference number 1310, goods information 1312, special instructions 1314, take photo option 1316, and/or tender information 1318. Pickup location 1302 may be a current location of goods. Pickup time 1304 may be a required amount of time for the transporter to arrive at arrival location 1302. In some embodiments, pickup time 1304 may be based on traffic and available routes received from geographical provider 106 (of FIG. 1). Further, pickup time 1304 may be no greater than a predetermined amount of time (e.g., one hour). This may be important for time-critical shipment of goods (e.g., a heart). Arrival button 1306 permits transporters to indicate arrival at the pickup location. Order number 1308 may an internal number for reference by authorized users and/or for processing by central server 102 (of FIG. 1). Reference number 1310 may be an external number for client use. Goods information 1312 permits transporters to view data relating to the goods. Good information may include a number of packages, size of the packages, weight of the packages, a tracking number, and identification information, to provide a few examples. Take photo option 1316 permits transporters to take photos of goods. Upon receipt of photos, central server 102 may determine if the goods are the appropriate goods for transport. Tender information 1318 permits transporters to view any information relating to a location for tendering the goods. As illustrated, in some embodiments, tender information 1318 may include a tender time and/or location. As noted above, transporters may not be aware of particulars of a job, such as a tender location, until acceptance of the job.

Figure 14:
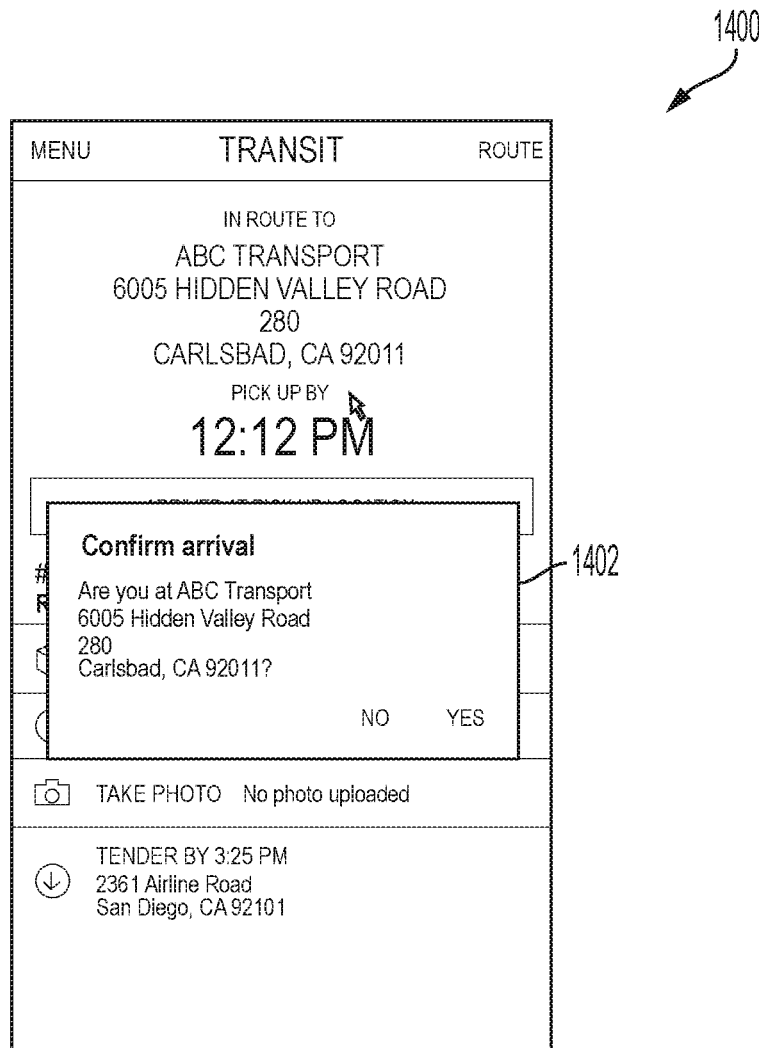
FIGS. 14-17 are example user interfaces of a transporter application for a transporter at a pickup or intermediate location, according to some embodiments.

Referring now to FIG. 14, upon arrival to a designated location (e.g., pickup location or intermediate location), prompt 1402 may be provided. As such, prompt 1402 may be automatically provided upon user device 108A (of FIG. 1) (e.g., a mobile device) detecting the presence of transporter at the designated location via location tracking of user transporter device 108A through transporter application 120 (of FIG. 1). Prompt 1402 may confirm that the transporter is at the designated location.

Figure 15:
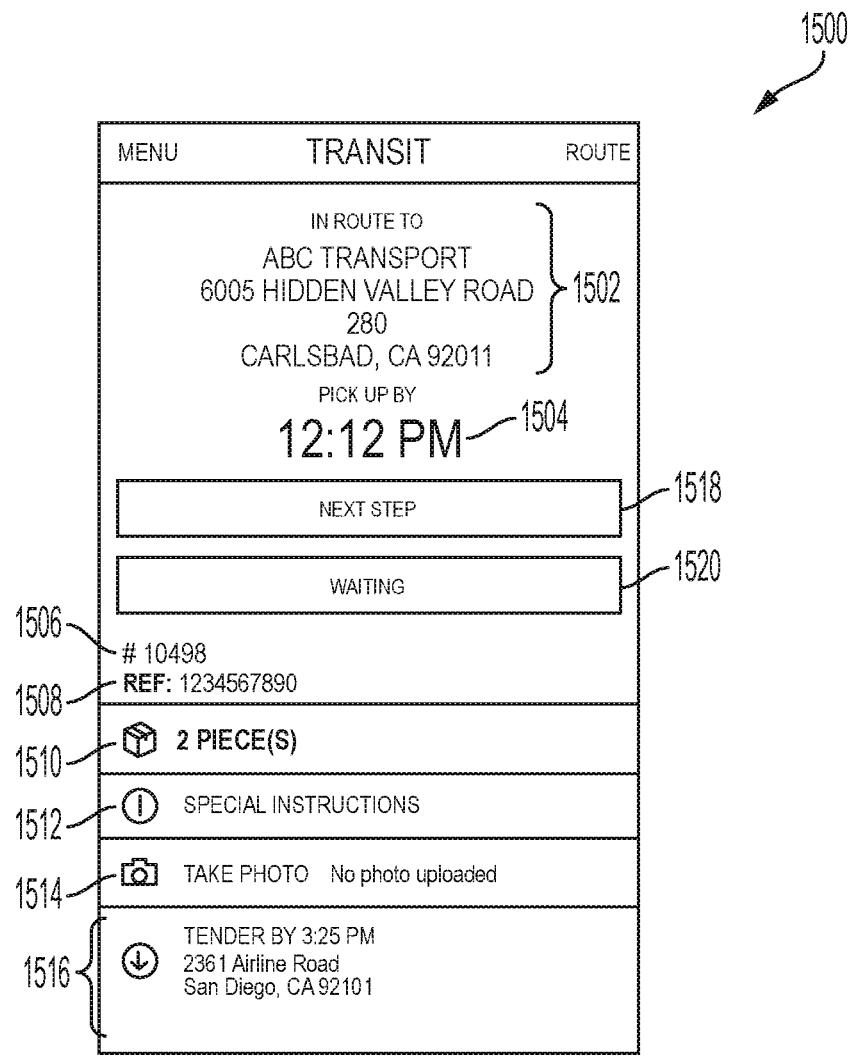

Referring now to FIG. 15, upon selection of arrival button 1306 (of FIG. 13) or confirming arrival via prompt 1402 (of FIG. 14), user interface 1500 may be provided. Like user interface 1300, user interface 1500 provides arrival location 1502, pickup time 1504, order number 1506, reference number 1508, goods information 1510, special instructions 1512, take photo 1514, and/or tender information 1516. User interface 1500 may also present next step option 1518 and/or waiting option 1520. Next step option 1518 may be selected when the goods are ready for transport and/or received by the transporter. In some embodiments, next step option 1518 may not be selected until the transporter application 120 (of FIG. 1) confirms the transporter is at the pickup location. The confirmation may be accomplished by tracking a location of transporter's user device 108A (of FIG. 1) and/or receiving an indication from the designated location. Waiting option 1520 may be selected when the goods are not ready for transport.

Figure 16:
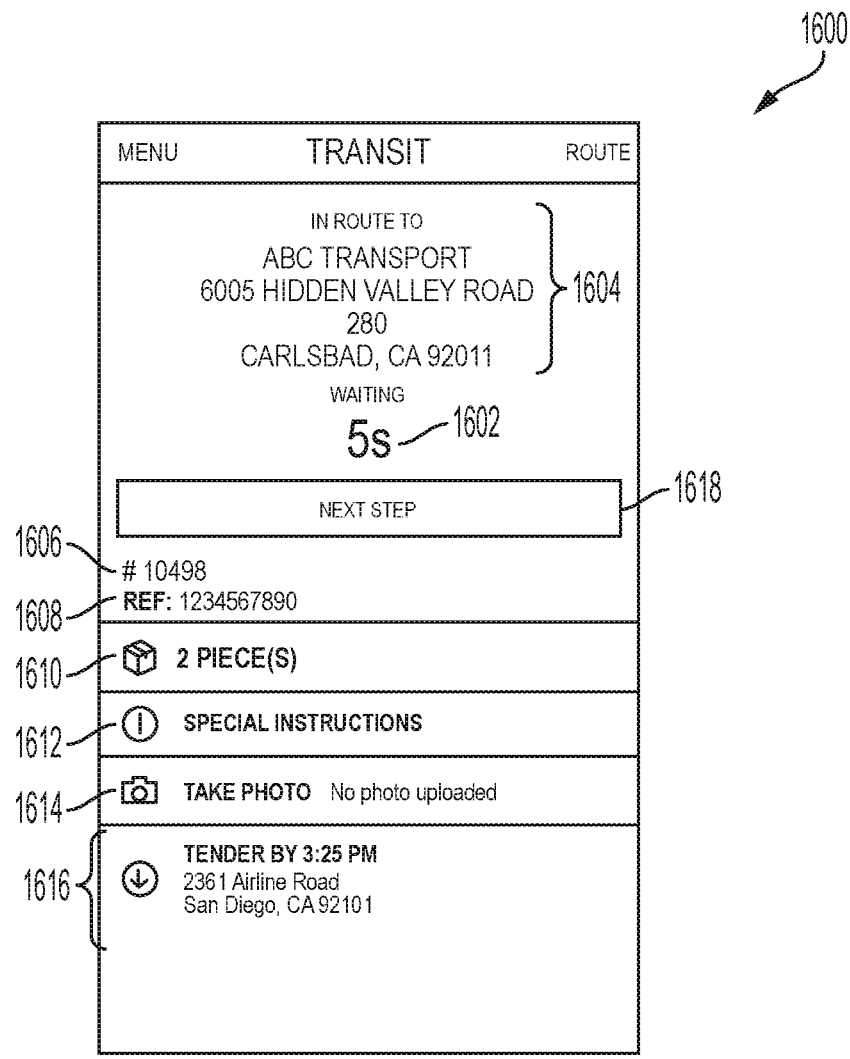

Referring now FIG. 16, upon selection of waiting option 1520 (of FIG. 15), user interface 1600 is provided. User interface 1600 tracks a waiting time 1602 at the designated location for the transporter to receive the goods. In some embodiments, when the transporter waits predetermined amounts of time (e.g., fifteen minutes), the transporter is to receive a predetermined additional amount of money. Like user interface 1500, user interface 1600 may also include arrival location 1604, order number 1606, reference number 1608, goods information 1610, special instructions 1612, take photo 1614, tender information 1616, and/or next step option 1618.

Figure 17:
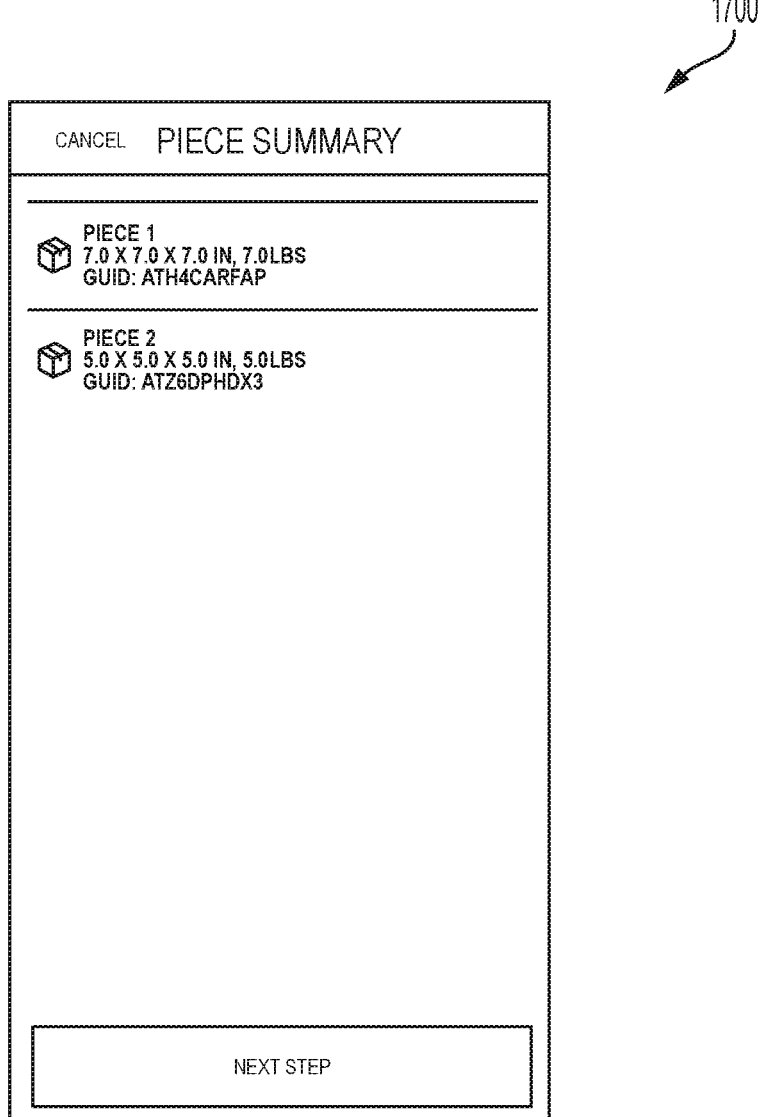

After selecting user interface 1500's next step option 1518 or user interface 1600's next step 1618, transporter may be prompted to enter a unique package number (e.g., an order number), take a picture of a code, and/or scanning a code via user device 108A (of FIG. 1). Thereafter, as illustrated in FIG. 17, user interface 1700 may provide goods information. Upon doing so, central server 102 (of FIG. 1) may verify that the transporter is picking up the correct package. Subsequently, transporter application 120 (of FIG. 1) may require receiving a name and/or signature of an authorized receiver at the pickup location via user device 108A.

Figure 18:
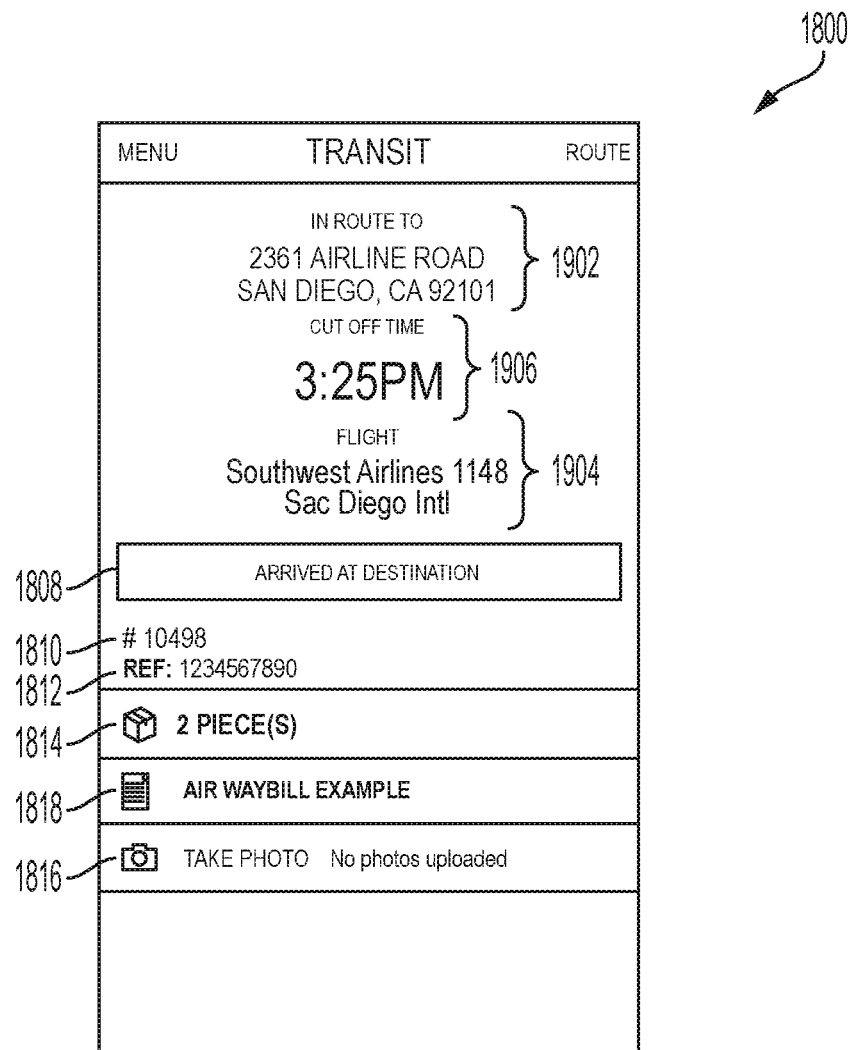
FIG. 18 is an example user interface of a transporter application for a transporter traveling to a destination location, according to some embodiments.

Referring now to FIG. 18, after the goods are verified, user interface 1800 may be provided. User interface 1800 may provide information for transporting the picked up goods to the tender location (e.g., an intermediate location or a destination location). User interface 1800 may also include tender location 1802, transport information 1804, cutoff time 1806, and/or arrival button 1808. Tender location 1802 is an intermediate or destination location. When the tender location 1802 is an intermediate location, transport information 1804 may provide transport information for the transport of the goods from the intermediate location to the next intermediate location or the destination location. For example, as illustrated, transport information 1804 may include a flight transporting the goods. Along these lines, cutoff time 1806 may be the latest time at tender location 1802 for receipt goods. As such, cutoff time 1806 may be based on transport information. For example, if a flight is delayed, cutoff time 1806 may be adjusted accordingly. Arrival button 1808 may provide an indication that the transporter has arrived at the tender location.

Like user interface 1600, user interface 1800 may also include order number 1810, reference number 1812, good information 1814, and/or take photo 1816. User interface 1800 may further include air waybill example 1818. As indicated above, transporters may tender goods to an intermediate location for further transport by a transportation company utilizing a mode of transportation. The intermediate location, the transportation company, or the mode of transportation may require a unique transport bill. For example, Delta Airlines, United Parcel Service, and United Airlines may all have different transport bills. As such, air waybill example 1818 may assist the transporter in accurately completing unique transport bills at the tender location so that there are no issues in tendering the goods.

Figure 19:
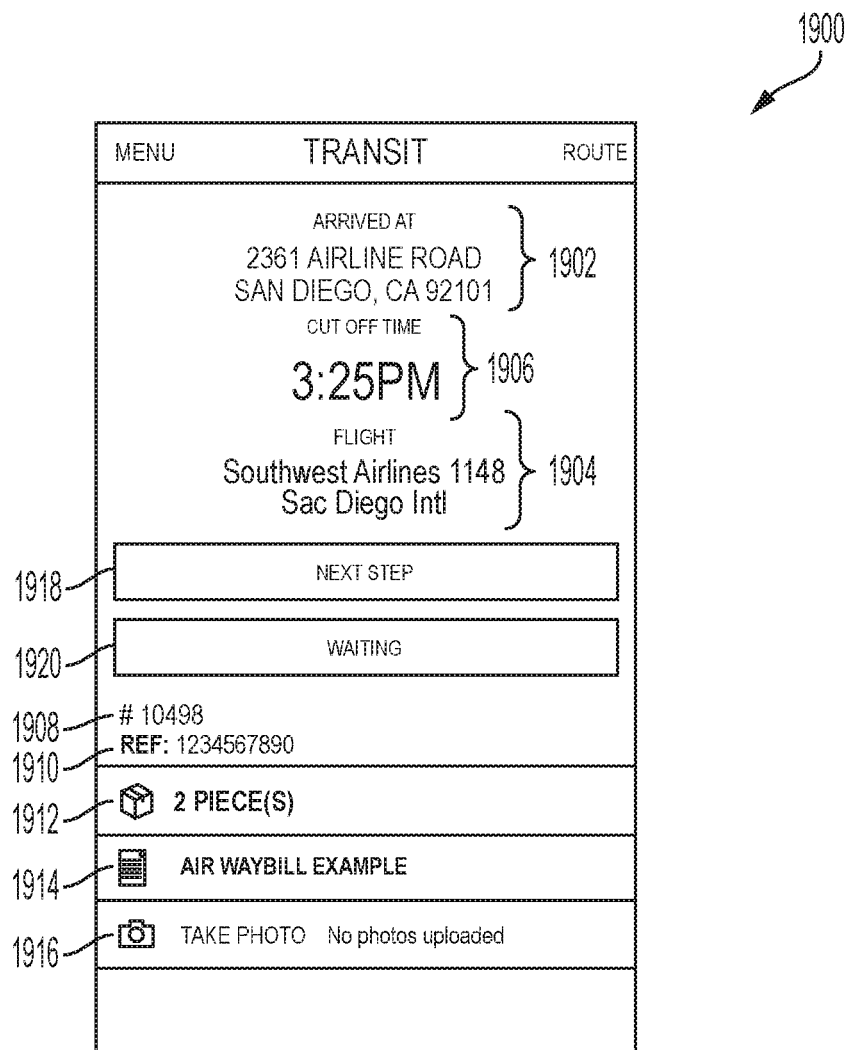
FIGS. 19 and 20 are example user interfaces of a transporter application for a transporter at a destination location, according to some embodiments.

Referring now to FIG. 19, upon selection of user arrival button 1808 (FIG. 18), user interface 1900 may be provided. Like user interface 1800, user interface 1900 may provide information for transporting the picked up goods to the tender location (e.g., an intermediate location or a destination location). As such, user interface 1900 may include tender location 1902, transport information 1904, cutoff time 1906, order number 1908, reference number 1910, good information 1912, air waybill example 1914, and/or take photo 1916. Further, like user interface 1800, user interface 1900 may provide next step option 1918 and/or waiting option 1920. Next step option 1918 is to be selected when the goods are received by the tender location. In some embodiments, next step option 1918 may not be selected until the transporter application 120 (of FIG. 1) confirms the tender location received the goods. Waiting option 1920 is to be selected when the transporter is waiting to tender the goods at the tender location.

Referring again FIG. 16, upon selection of waiting option 1920 (of FIG. 19), user interface 1600 is provided. User interface 1600 provides a waiting time 1602 at the tender location for the transporter to tender the goods. In some embodiments, when the transporter waits predetermined amounts of time (e.g., fifteen minutes), the transporter is to receive a predetermined additional amount of money.

After selecting user interface 1900's next step option 1918 or user interface 1600's next step option 1618, the transporter may be prompted to enter a unique package number (e.g., an order number), take a picture of a code, and/or scanning a code via user device 108A (of FIG. 1). Thereafter, as illustrated in FIG. 17, user interface 1700 may provide good information. Upon doing so, central server 102 (of FIG. 1) may verify that the transporter is picking up the correct package. Subsequently, transporter application 120 (of FIG. 1) may require receiving a name and/or signature of an authorized receiver at the pickup location via user device 108A.

Figure 20:
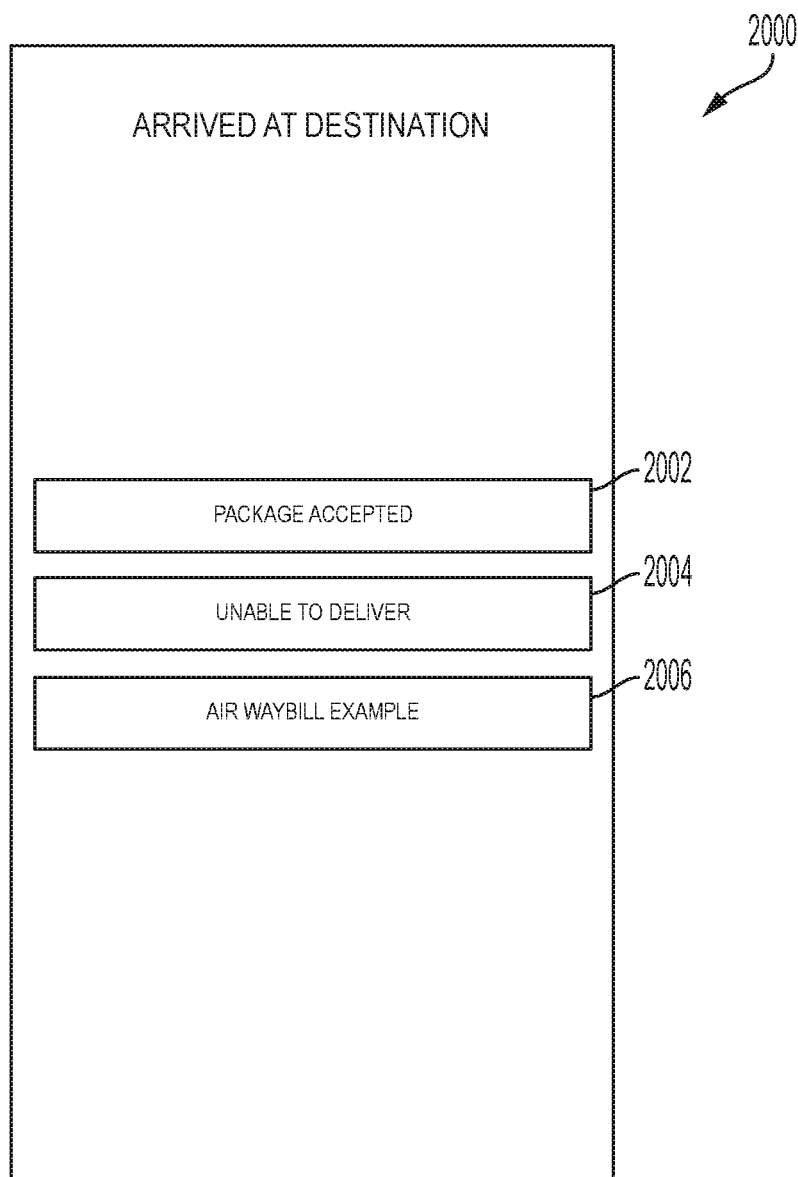

Referring now to FIG. 20, after verification by the central server 102 (of FIG. 1), user interface 2000 may be provided. User interface 2000 may include package accepted button 2002, unable to deliver button 2004, and/or air waybill example button 2006. Upon indicating the package is accepted via package accepted button 2002, the transporter may be required to enter an airway bill number and/or provide a picture of the airway bill.

Figure 21:
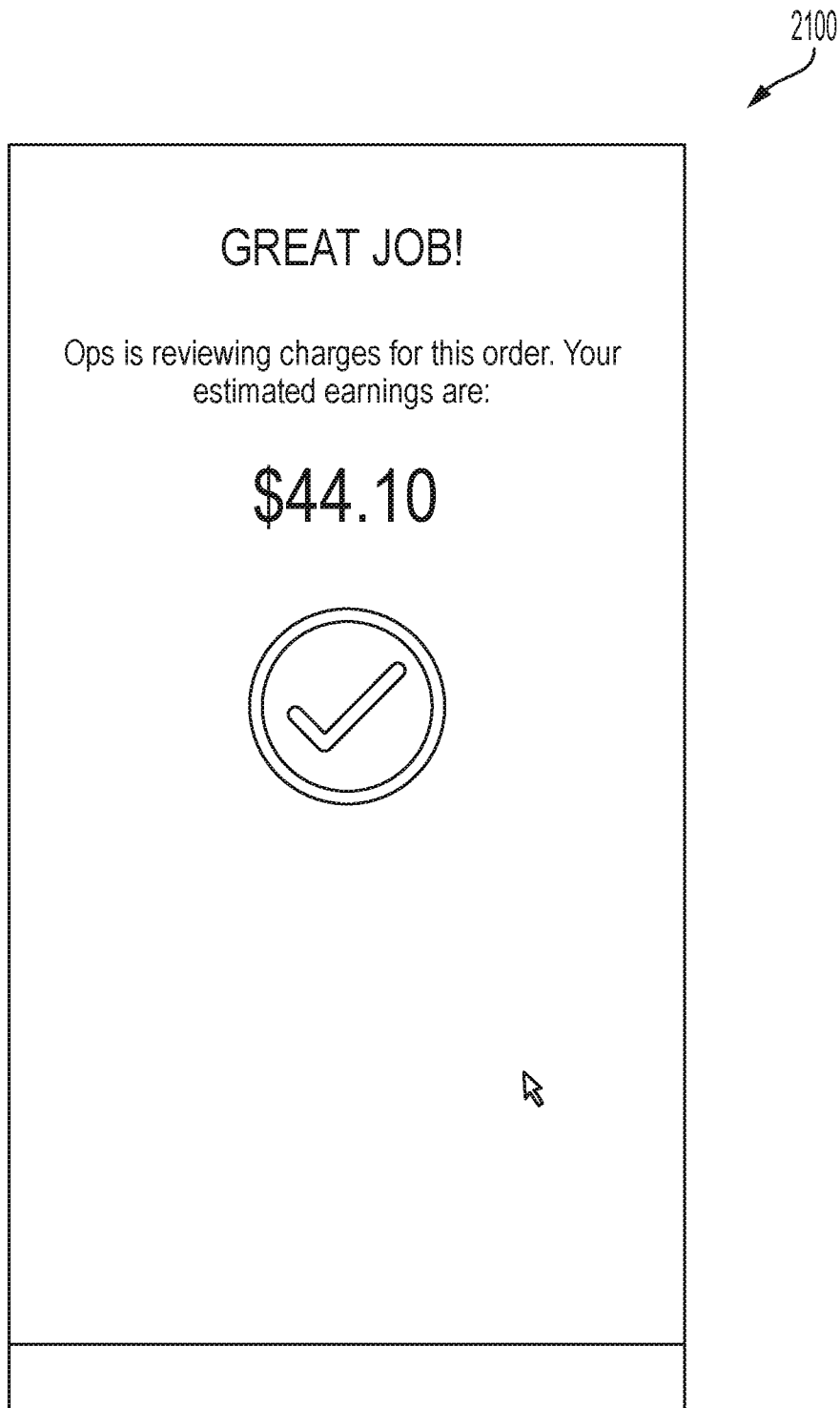
FIG. 21 is an example user interface of a transporter application for a transporter upon completion of transportation of goods of an order, according to some embodiments.

Referring now to FIG. 21, after tendering the package at the tender location, user interface 2100 may be provided. User interface 2100 may provide a transporter with the reward. As illustrated, the reward may be an amount of money. However, the reward may also be a number of points or any other type of token for service. As such, transporters may not be aware of their reward until after tendering the goods at the tender location or attempting to do so. Further, as explained above, the reward may be based on their waiting times at the pickup location and/or tender location. Further, the reward may be based on the length of the trip, the time duration of the trip, and/or the importance of the goods. Along these lines, the reward may be reduced if the transporter does not arrive at the pickup and/or dispatch location by the specified time.

Referring back to FIG. 1, transport manager application 122 permits authorized users—via user devices 108A-C—to track and/or manage orders for the transport of goods. Accordingly, upon submission of an order as described with respect to FIGS. 2-4, transport manager application 122 may receive an order for the transport of goods. Transport manager application 122 may assign the order to a predetermined order type based on the type of goods and/or the mode of transportation. For example, some goods require special handling (e.g., refrigeration, chemicals, body parts), whereas other orders may be of a special type (e.g., healthcare orders or medical orders). Accordingly, by assigning the order to an appropriate order type, transport manager application 122 may ensure that an appropriate operational team member (e.g., handler)—having the requisite skill and knowledge—to monitor the transport of the order.

In some embodiments, transport manager application 122 may assign the appropriate operational team members to the orders. Alternatively, transport manager application 122 may allow the appropriate operational team member to select an order to monitor. Along these lines, multiple operational team members may work on orders during transport of the goods from the pickup location to the destination location.

Further, in some embodiments, transport manager application 122 may receive preferred routes from route generator module 116. Transport manager application 122 may also permit appropriate operational team members to approve, create, and/or modify determined preferred routes. Further, transport manager application 122 may permit appropriate operational team members to assign transporters for the transport of the order. Similarly, transporter manager application 122 may permit authorized users to assign tasks to transporters. In doing so, transporter manager application 122 may provide transporters an amount of money for completing or attempting to complete the assigned tasks.

Further, to monitor the transport of orders, transport manager application 122 may receive updates from the transporters on the status of the transport. In some embodiments, transport manager application 122 may receive updates from transport provider 104 on the delay of scheduled transports (e.g., flights, trains, buses). Likewise, in some embodiments, transport manager application 122 may receive updates from geographical provider 106 relating to drive-only transportation (e.g., traffic, road closure, accidents). Further, in some embodiments, transport manager application 122 may receive updates from the transporters—via user devices 108A-C—scheduled to pick up goods from the pickup and/or intermediate locations. For example, the transporters may not have been departed to and/or from the pickup and/or intermediate locations by the designated time. Accordingly, in some embodiments, transport manager application 122 may receive updates from transport provider 104, geographical provider 106, and/or user devices 108A-C in real-time.

By operating in such a fashion, transport manager application 122 may permit appropriate operational team members to monitor orders during their transport. In doing so, in some embodiments, transport manager application 122 may assign scheduled actions to the orders. Transport manager application 122 may also receive scheduled actions for the orders from the appropriate operational team members. Scheduled actions may relate to a required operation from a transporter departing to, arriving at, and/or departing from a pickup location, an intermediate location, and/or destination location. As such, in some embodiments, the scheduled actions may relate to a specific time. Accordingly, transport manager application 122 may sort the orders based on their upcoming time and assign them a color based thereon (e.g., green, yellow, and red).

FIGS. 22-25 illustrate user interfaces 2200, 2300, 2400, and 2500 provided by transport manager application 122 (of FIG. 1). FIG. 22 illustrates user interface 2200 for tracking orders 2202 in real-time. User interface 2200 provides order types 2204A-J and allows handlers to select and view orders of the different order types 2204A-J. Each order type 2204A-J may require different handling and/or skill. As such, operational teams may be trained to manage and/or handle different groups of order types 2204A-J. As such, operational team members (e.g., handlers) may select or be assigned orders.

As illustrated, order types 2204A-J may include all orders 2204A, ground orders 2204B, next flight out (NFO) orders 2204C, fright orders 2204D, healthcare orders 2204E, immediate (STAT) orders 2204F, medical collection (MCP) orders 2204G, routed orders 2204H escalated orders 2204I, and/or will call orders 2204J. All orders 2204A may relate all orders currently being processed. As such, all orders 2204A includes ground orders 2204B, NFO orders 2204C, fright orders 2204D, healthcare orders 2204E, STAT orders 2204F, MCP orders 2204G, routed orders 2204H, and/or escalated orders 2204I. Ground orders 2204B relates to orders of goods being transported by ground. As such, ground order 2204B relates to orders of goods whose routes do not have a segment and have a mode of transportation other than ground (e.g., a flight segment). NFO orders 2204C relates to orders of goods to be transported by flight and not requiring special handling. Freight orders 2204D relate to orders of goods needing special handling. For example, freight orders 2204D may be above a predetermined weight (e.g., 100 lbs.), greater than a predetermined dimension (e.g., 5 FT×5 FT×5 FT), call for a controlled temperature (e.g., less than 29° F.), and require secure shipment, to provide a few examples.

Healthcare orders 2204E may relate to orders of healthcare goods, which may or may not require special handling. STAT orders 2204F may relate to goods to be transported at predefined times (e.g., 8:00 AM and 4:00 PM) and/or places (e.g., hospitals, doctor offices, and pharmacies). MCP orders 2240G relate to orders of goods that require skill by transporters. In some embodiments, for example, the packages may contain blood or a bodily tissue. Routed orders 2204H relates to orders having predetermined routes required to be followed by transporters. For example, where the transporter has multiple orders and must pick up one order or drop one order off in a particular sequence, the orders may be considered routed orders 2204H. Escalated order 2204I relates to any order manually escalated by an authorized user. As such, escalated order 2204I may include ground orders 2204B, NFO orders 2204C, fright orders 2204D, healthcare orders 2204E, STAT orders 2204F, MCP orders 2204G, and/or routed orders 2204H. Will call orders 2204J may be orders of goods submitted via will call by users, as described above with respect to FIG. 2. Will call orders 2204J are not active orders 2204A.

User interface 2200 presents all orders 2202 categorized under all orders group 2204A. For each order 2202, user interface 2200 provides handler 2206, order number 2208, status indicator 2210, current transporter 2212, target location 2214, and/or scheduled action 2216. Handler 2206 may be individual or member of the appropriate operational team in charge of the order of goods. Order number 2208 may be a unique alphanumeric number generated by central server 102 (of FIG. 1) for the order. Status indicator 2210 may provide an indication of where the goods are in the route generated by central server 102. For example, the goods may be at a pickup location, in transport to an intermediate location, at an intermediate location, in transport to a destination location, and/or at a destination location. Current transporter 2212 may refer to a specific transporter transporting the good at a particular time. Target location 2214 may refer to a current pickup location, intermediate location, or delivery location being traveled to by the transporter currently transporting the good. Scheduled action 2216 may be a follow-up action provided by handler 2206. The follow-up action may specify a desired time to perform the action.

In some embodiments, although not illustrated, orders 2202 may be designated a predetermined color based on a transportation status and/or status action. The transportation status may relate to a departure time, pickup time, and/or a tender time. As discussed above, the transporter may be required to depart from their current location or an intermediate location at a specific departure time. Likewise, the transporter may be required to pickup goods at a pickup location at a specific pick up time. Further, the transporter may be required to tender the package at an intermediate location (e.g., an airport) at a specific tender time. As such, the orders 2202 may change colors based on the transportation status. In some embodiments, the predetermined colors may be red, yellow, or green. The designated color may be selected based on predetermined rules. For example, an order of goods may be green until reaching a predefined threshold and thereafter change to yellow. Thereafter, after reaching another predefined threshold, the order of goods may change to red. This may allow assigned handlers or other authorized users to track the orders of goods.

Figure 23:
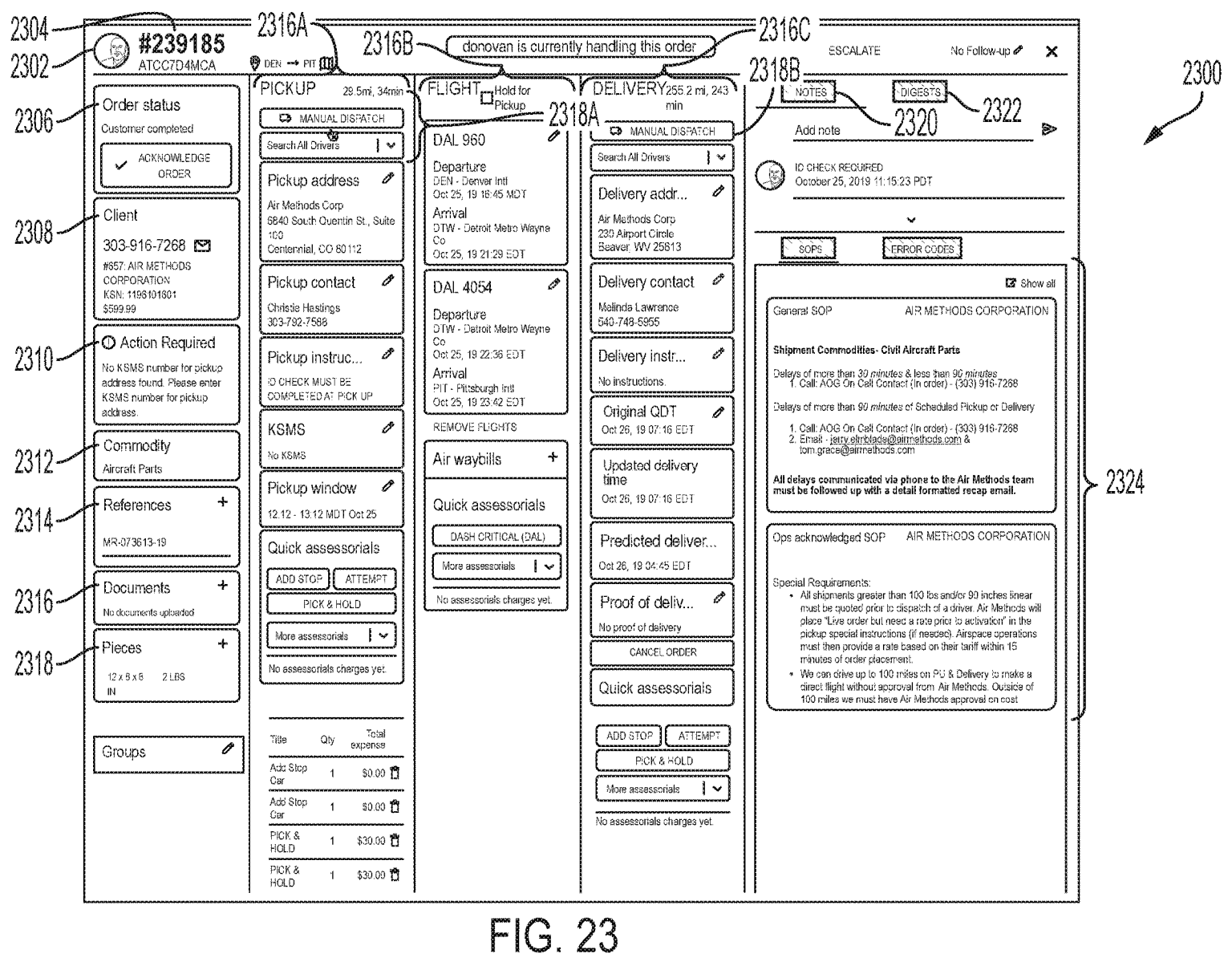

Referring now to FIG. 23, after the selection of a particular order 2202 (of FIG. 22) by a handler, user interface 2300 may be presented. User interface 2300 may include assigned handler 2302, order number 2304, order status 2306, user information 2308, actions required 2310, commodity type 2312, reference number 2314, attached documents 2316, and/or goods information 2318. Order status 2306 may be updated in real-time and be one of a predetermined number of events, such as those illustrated status indicator 2210 (of FIG. 22). User information 2308 may include contact information of a user requesting the transport of goods. Actions required 2310 may include actions required by a handler. Commodity type 2312 may relate to a good type. Reference number 2314 may be a tracking number for a particular package of goods of the order being transported. In some embodiments, an order may include multiple packages having different tracking numbers. Attached documents 2316 may be documents relating to the transport of the goods and may be uploaded by the transporter (e.g., airway bill) and/or handler (e.g., airway bill example). As such, user information 2308, commodity type 2312, and/or goods information 2318 may be provided via a user request at user interface 200 (of FIG. 2).

User interface 2300 may also include segment information 2316A-C for segments of a route from a pickup location to a destination location. In some embodiments, as illustrated, segment information 2316A relates to picking up the goods, segment information 2316B relates to tendering the goods at an intermediate location (e.g., an airport), and/or segment information 2316C relates to delivering the goods to a drop off location. As such, segment information 2316A includes transporter information (e.g., a name, a license plate, and/or a type of vehicle), a pickup address, a pickup contact, pickup instructions, a pickup window, and/or assessorials. Segment information 2316B includes information of the intermediate location. For example, when the intermediate location is an airport, segment information 2316B may include flight information (e.g., departure time, arrival time, departure location, arrival location, and flight number), and airway bills. Segment information 2316C includes a transporter delivery address, a delivery contract, delivery instructions, an original quoted delivery time, an updated delivery time, a proof of delivery, and assessorials.

As stated above, segment information 2316A and 2316C may include transporter information. In some embodiments, as described above, upon submission of orders by users, the central server 102 (of FIG. 1) may automatically select the appropriate transporter. Segment information 2316A and 2316C may also permit members to manually dispatch transporters 2318A and 2318B. As such, referring now to FIG. 24, eligible and ineligible transporters 2402 may be provided. For each transporter 2402, user interface 2400 may provide a rating, an availability, and/or an estimated time of arrival.

Referring back to FIG. 23, via assessorials, segment information 2316A and 2316C permits assigned handlers to provide or select tasks (e.g., picking up dry ice for medication and/or printing documents) for transporters of goods. The handlers may reward the transporters for performing the tasking or attempting to do so, for example, by providing them a selected or predetermined amount of money. As explained above, the reward amount may be unknown to the transporter until completion of the transport.

Figure 25:
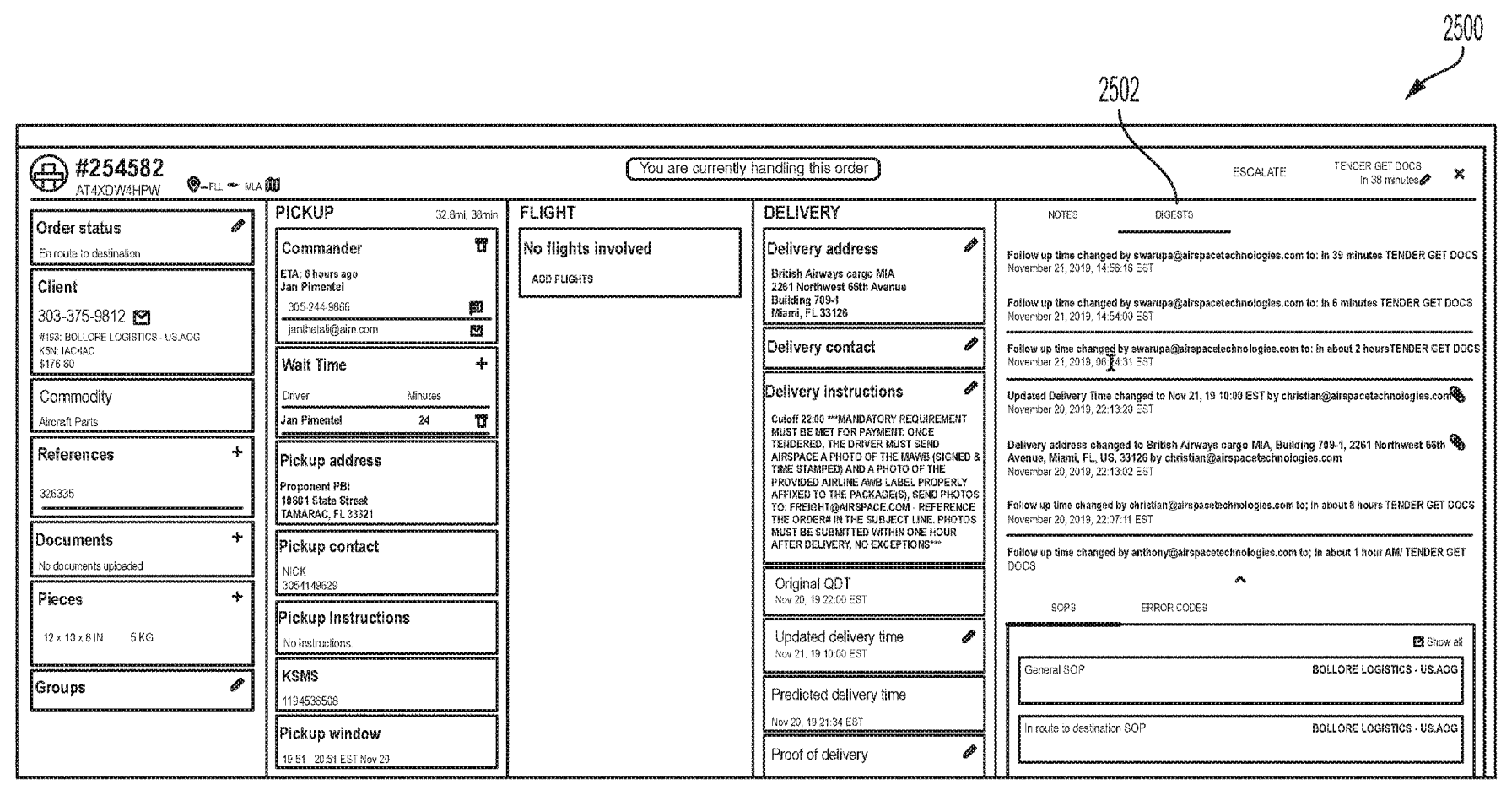
Figure 26:
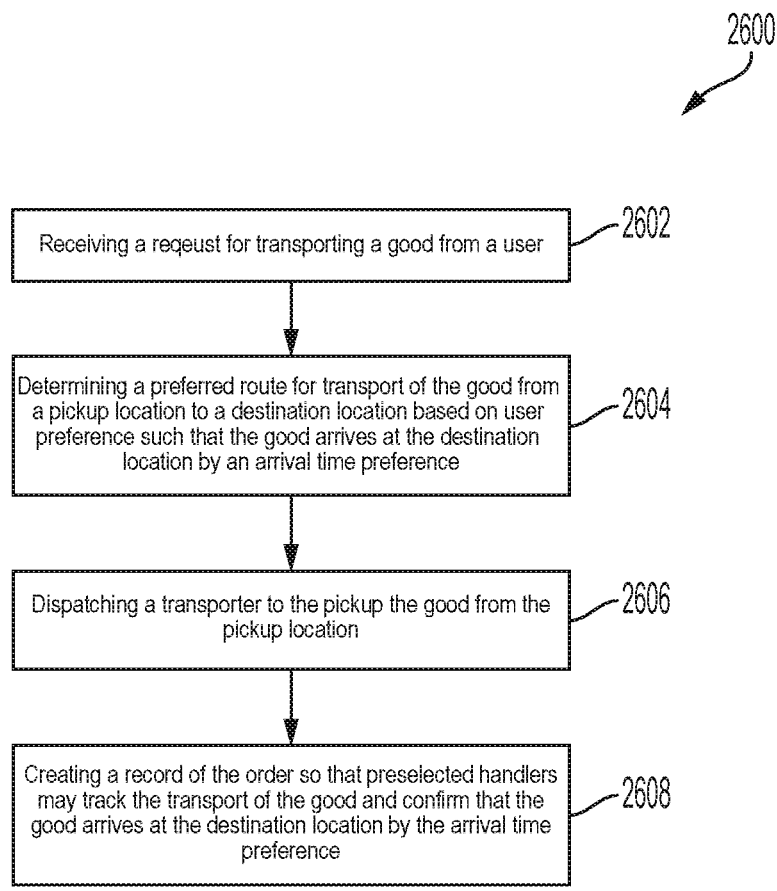
FIG. 26 is a flowchart illustrating an example process for managing the transport of goods, according to some embodiments.
Figure 27:
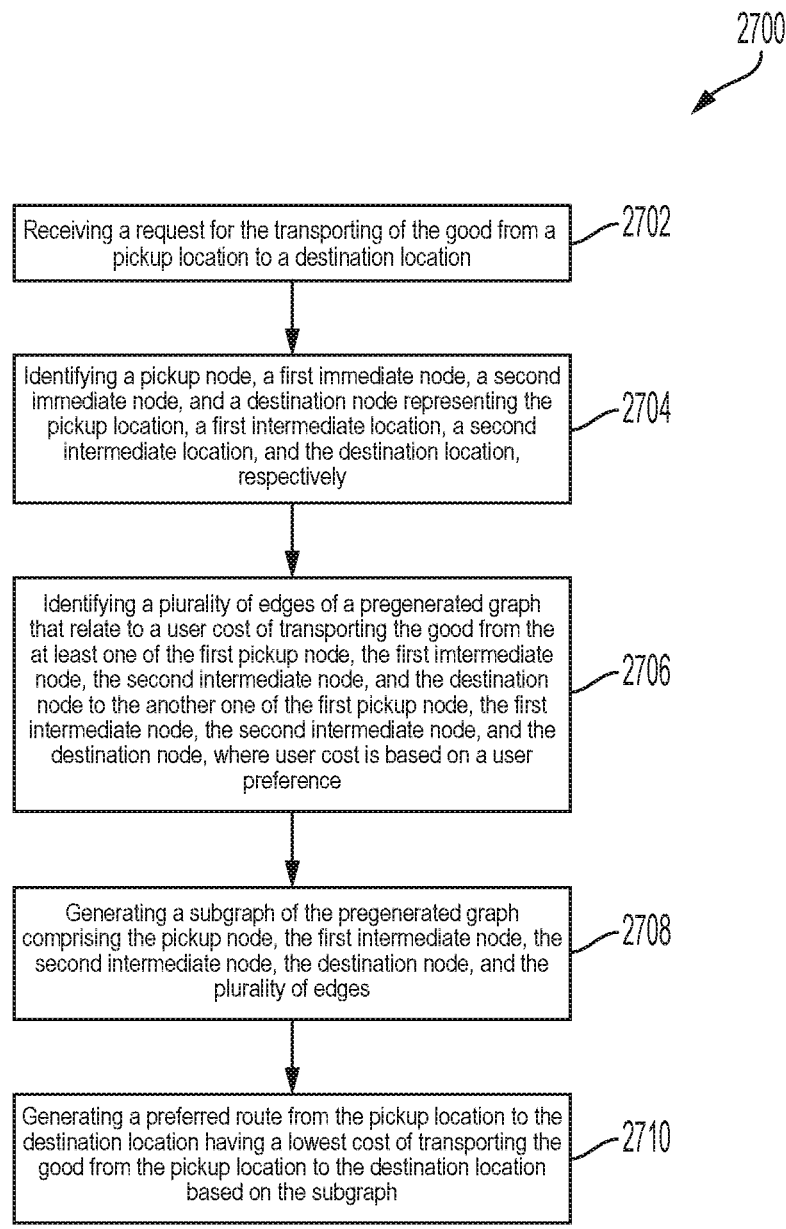
FIG. 27 is a flowchart illustrating an example process for transporting a good from one location to another location, according to some embodiments.
Figure 28:
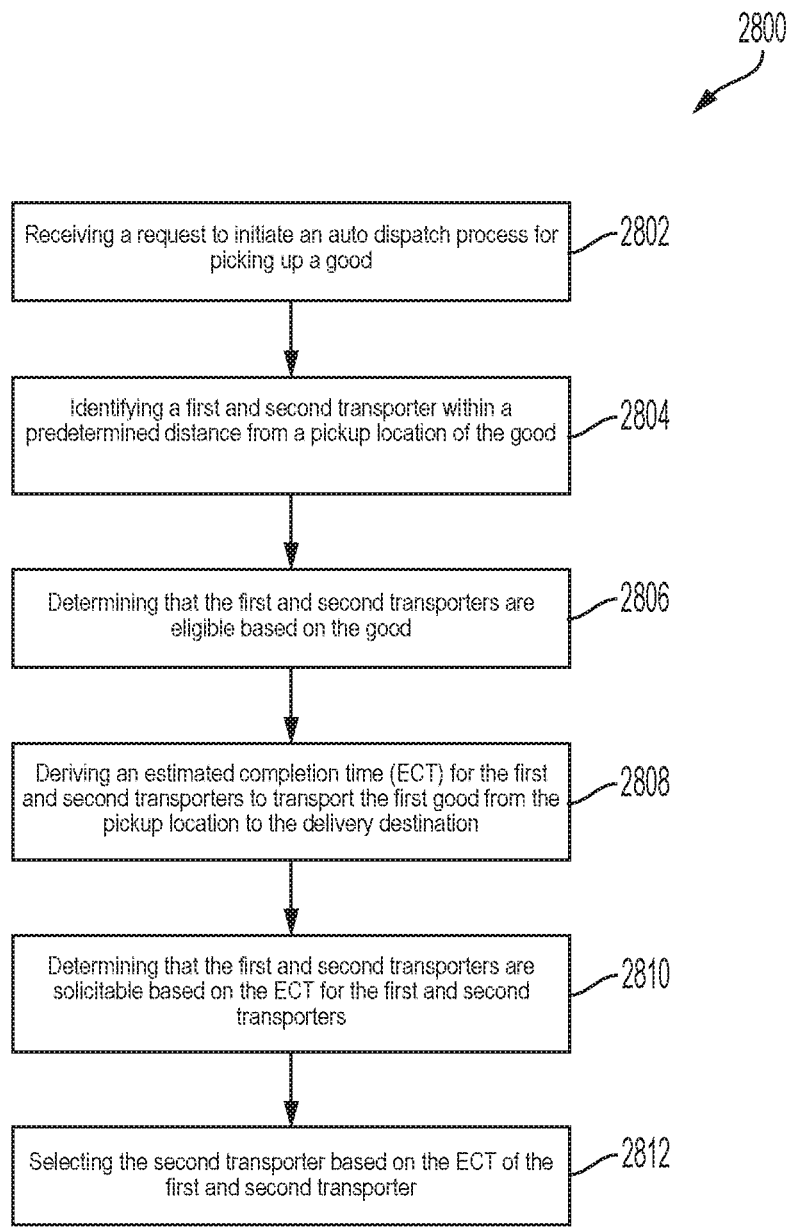
FIG. 28 is a flowchart illustrating an example process for identifying an appropriate transporter of a good, according to some embodiments.
Figure 29:
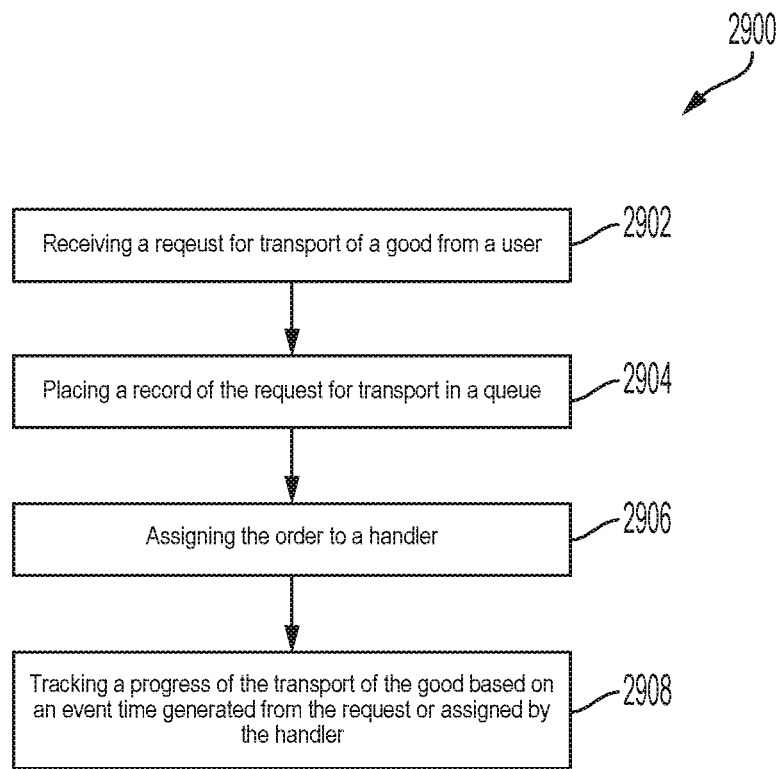
FIG. 29 is a flowchart illustrating an example process for minimizing the risk of a good delivered past a requested time, according to some embodiments.

User interface 2300 may permit handlers to provides notes 2320, digest 2322, and/or special operational instructions (SOP) 2324. Notes 2320 may be provided by handlers for themselves or future handles. Digest 2322 may be automatically generated by transport manager application 122 (of FIG. 1) in real-time and may include a particular action and associated time and/or date for the performance of the action. As illustrated in FIG. 25, user interface 2500's digest 2502 may include events performed by transporters (e.g., leaving starting location, arriving at pickup location, departing pickup location, arriving at tender location, and completing tender) and/or handlers (e.g., uploading tender documents, changing follow-up time, and changing delivery address). SOP 2324 may be provided handlers and/or users. As such, notes 2320 and/or SOP 2324 may be provided and performed by different handlers FIG. 26 is a flowchart for method 2600 for managing the transport of goods, according to some embodiments. FIG. 27 is a flowchart for method 2700 for transporting a good from a pickup location to a destination location, according to some embodiments. FIG. 28 is a flowchart for method 2800 for identifying an appropriate transporter of a good, according to some embodiments. FIG. 29 is a flowchart for method 2900 for minimizing a risk of a good being delivered past a requested time, according to some embodiments. Method 2600, 2700, 2800, and 2900 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously or in a different order than shown in FIGS. 26-29, as will be understood by a person of ordinary skill in the art.

Referring now at FIG. 26, method 2600 shall be described with reference to FIGS. 1, 2, 5, 9, and 22. However, method 2600 is not limited to that example embodiment.

At 2602, central server 102 receives a request for transporting a good from a user. The request includes a pickup location (e.g., pickup address 204), a destination location (e.g., destination address 210), a user preference, and an arrival time preference.

At 2604, central server 102 determines a preferred route for transport of the good from the pickup location 502 to the destination location 504 based on the user preference such that the good arrives at the destination location 504 by arrival time preference. In some embodiments, the preferred route may include one or more intermediate locations 506A-C.

At 2606, central server 102 dispatches transporter 906A to the pickup the good from a location (e.g., pickup location 904). Transporter 906A may be selected from many transporters 906A-C based on a quickest arrival time to the good's location. In some embodiments, transporter 906A may be further from pickup location 904. In some embodiments, transporter 906A may have been previously assigned goods for another order to pick up and/or delivery. As such, in some embodiments, transporter 906A may be considered among other transporters 906B and 906C not previously assigned goods for other orders to pick up and/or delivery.

At 2608, central server 102 creates a record of the order 2202 so that preselected handlers 2206 may track the transport of the good and confirm that the good arrives at the destination location by the arrival time preference. The assigned handler may be selected based on the type of product.

Referring now at FIG. 27, method 2700 shall be described with reference to FIGS. 1, 2, and 5. However, method 2700 is not limited to that example embodiment.

At 2702, user request application 114 receives a request for transport of a good from a user. The request includes pickup location (e.g., pickup address 204) and destination location (e.g., destination address 210). In some embodiments, the request may include a user preference (e.g., a particular airline or mode of transportation) and/or an arrival time preference. Alternatively, central server 102 may determine user preference and/or arrival time.

At 2704, route generator module 116 identifies a first pickup node, a first intermediate node, a second intermediate node, and a delivery node on a pre-generated graph corresponding to the pickup location 502, a first intermediate location 506A, a second intermediate location 506B, and the destination location 504.

At 2706, route generator module 116 identifies one or more transportation edges relating to a transit cost associated with a corresponding one of the pickup location, the first intermediate location, the second intermediate location, and the destination location. As such, each of the plurality of transportation edges corresponds to one of the pickup node, the first intermediate node, the second intermediate node, and the destination node such that each of the pickup node, the first intermediate node, the second intermediate node, and the destination node corresponds to the transit cost.

At 2708, route generator module 116 generates a subgraph of the pre-generated graph including the pickup node, the first intermediate node, the second intermediate node, the destination node, and/or the plurality of transportation edges.

At 2710, route generator module 116 generates a preferred route from the pickup location to the destination location having a lowest transit cost of transporting the good from the pickup location to the destination location based on the subgraph.

Referring now at FIG. 28, method 2800 shall be described with reference to FIGS. 1, 2 and 9. However, method 2800 is not limited to that example embodiment.

At 2802, transporter module 118 receives a request to initiate an auto dispatch process for picking up a good of an order. The request includes the first good, a pickup location (e.g., pickup address 204), and a delivery destination (e.g., an intermediate location or destination address 210). In some embodiments, the request may include a user preference (e.g., a particular airline or mode of transportation) and/or an arrival time preference. Alternatively, central server 102 may determine user preference and/or arrival time.

At 2804, transporter module 118 identifies first and second transporter 906A and 906B within a predetermined distance from pickup location 904 of the good or intermediate locations during route of the order's good. In some embodiments, second transporter 906B can be transporting a good of another order. Second transporter 906B can be in the process of performing another job. For example, second transporter 906B can be picking up another order's good the same or different pickup location 904/intermediate location. Second transporter can be transporting the other order's good to the same or different delivery destination (e.g., an intermediate location or destination address 210).

At 2806, transporter module 118 determines that first and second transporters 906A and 906B are eligible for transport based on the good. As discussed above, the goods may require special handling by the transporters. For example, the goods may be fragile (e.g., glass) or an organ (e.g., a heart). Further, the goods may be heavy (e.g., furniture) or need refrigeration (e.g., produce) and thus require special transportation. Likewise, the goods may be of a certain size (e.g., a car) and thus need a suitable size carrier.

At 2808, transporter module 118 derives an Estimated Completion Time (ECT) for first and second transporters 906A and 906B to transport the first good from the pickup location to the delivery destination. In some embodiments, first transporter 906A may have been previously assigned another job (i.e., to pick up deliver goods to the same and/or different locations).

At 2810, transporter module 118 determines that the first and second transporters 906A and 906B are solicitable based on the ECT for the first and second transporters 906A and 906B.

At 2812, transport module 118 selects the second transporter 906B based on the ECT of the first and second transporters 906A and 906B. Accordingly, in some embodiments, second transporter 906B previously assigned another job—may be selected over first transporter 906A—not previously assigned any jobs.

Referring now at FIG. 29, method 2900 shall be described with reference to FIGS. 1, 2, and 25. However, method 2900 is not limited to that example embodiment.

At 2902, transport manager application 122 receives a request for transport of a good from a user. The request includes pickup location (e.g., pickup address 204) and destination location (e.g., destination address 210). In some embodiments, the request may include a user preference (e.g., a particular airline or mode of transportation) and/or an arrival time preference. Alternatively, central server 102 may determine user preference and/or arrival time.

At 2904, transport manager application 122 places a record of the request for transport in a queue. Before doing so, central server 102 may derive a preferred route from the pickup address 204 to destination address 210.

At 2906, transport manager application 122 assigns the order to handler 2206. In some embodiments, transport manager application 122 may automatically assign the order to appropriate handler 2206 (e.g., an available handler). In some embodiments, transport manager application 122 may accept a request from handler 2206 and assign it to handler 2206.

At 2908, transport manager application 122 tracks the progress of the transport of the good based on an event time generated from the request or assigned by handler 2206. For example, in some embodiments, transport manager application 122 will track transporter progress in departing from their current or pickup location and arriving at an intermediate location or destination location. In some embodiments, transporter manager application 122 may provide the progress via user interface 2200's scheduled action 2216.

Figure 30:
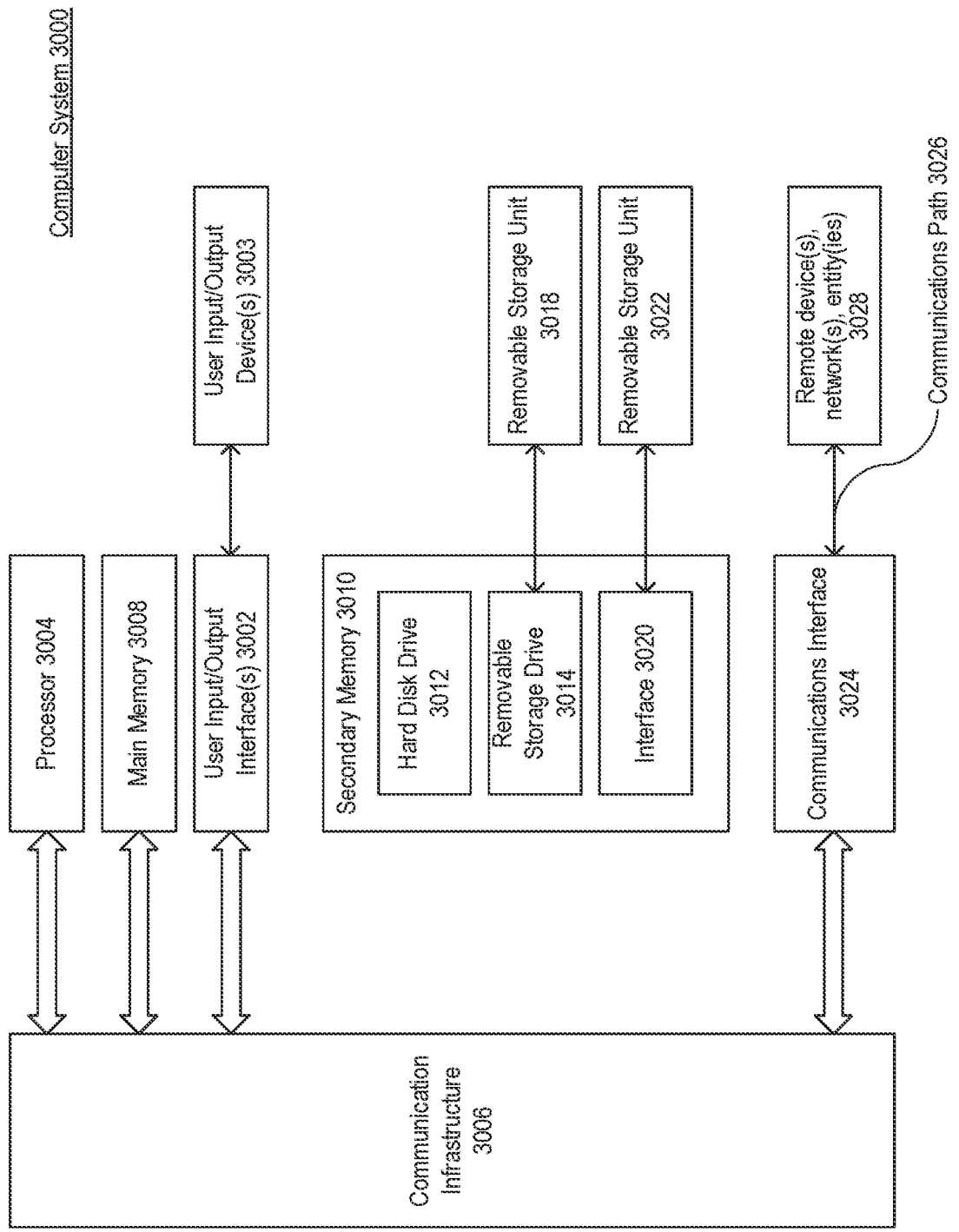
FIG. 30 is an example computer system useful for implementing various embodiments.

Various embodiments may be implemented, for example, using one or more well-known computer systems, such as computer system 3000 shown in FIG. 30. One or more computer systems 3000 may be used, for example, to implement any of the embodiments discussed herein, as well as combinations and sub-combinations thereof.

Computer system 3000 may include one or more processors (also called central processing units, or CPUs), such as a processor 3004. Processor 3004 may be connected to a communication infrastructure or bus 3006.

Computer system 3000 may also include user input/output device(s) 3003, such as monitors, keyboards, pointing devices, etc., which may communicate with communication infrastructure 3006 through user input/output interface(s) 3002.

One or more processors 3004 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 3000 may also include a main or primary memory 3008, such as random access memory (RAM). Main memory 3008 may include one or more levels of cache. Main memory 3008 may have stored therein control logic (i.e., computer software) and/or data.

Computer system 3000 may also include one or more secondary storage devices or memory 3010. Secondary memory 3010 may include, for example, a hard disk drive 3012 and/or a removable storage device or drive 3014. Removable storage drive 3014 may be a floppy disk drive, a magnetic tape drive, a compact disk drive, an optical storage device, tape backup device, and/or any other storage device/drive.

Removable storage drive 3014 may interact with a removable storage unit 3018. Removable storage unit 3018 may include a computer-usable or readable storage device having stored thereon computer software (control logic) and/or data. Removable storage unit 3018 may be a floppy disk, magnetic tape, compact disk, DVD, optical storage disk, and/any other computer data storage device. Removable storage drive 3014 may read from and/or write to removable storage unit 3018.

Secondary memory 3010 may include other means, devices, components, instrumentalities or other approaches for allowing computer programs and/or other instructions and/or data to be accessed by computer system 3000. Such means, devices, components, instrumentalities, or other approaches may include, for example, a removable storage unit 3022 and an interface 3020. Examples of the removable storage unit 3022 and the interface 3020 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 3000 may further include a communication or network interface 3024. Communication interface 3024 may enable computer system 3000 to communicate and interact with any combination of external devices, external networks, external entities, etc. (individually and collectively referenced by reference number 3028). For example, communication interface 3024 may allow computer system 3000 to communicate with external or remote devices 3028 over communications path 3026, which may be wired and/or wireless (or a combination thereof), and which may include any combination of LANs, WANs, the Internet, etc. Control logic and/or data may be transmitted to and from computer system 3000 via communication path 3026.

Computer system 3000 may also be any of a Personal Digital Assistant (PDA), desktop workstation, laptop or notebook computer, netbook, tablet, smartphone, smartwatch or other wearable, appliance, part of the Internet-of-Things, and/or embedded system, to name a few non-limiting examples, or any combination thereof.

Computer system 3000 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), Digital Center as a service (DCaaS), software as a service (SaaS), managed software as a service (MSaaS), platform as a service (PaaS), desktop as a service (DaaS), Function as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 3000 may be derived from standards including but not limited to JavaScript Object Notation (JSON), Extensible Markup Language (XML), Yet Another Markup Language (YAML), Extensible HyperText Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 3000, main memory 3008, secondary memory 3010, and removable storage units 3018 and 3022, as well as tangible articles of manufacture embodying any combination of the foregoing. Such control logic, when executed by one or more data processing devices (such as computer system 3000), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 30. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc., using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments but should be defined only in accordance with the following claims and their equivalents.

What is claimed is:

1. A computer-implemented method for a transporting of a good, comprising:
   receiving, by one or more processors, a user request for the transporting of the good from a pickup location to a destination location;
   identifying, by the one or more processors and within a pre-generated graph data structure, a pickup node representing the pickup location and a destination node representing the destination location;
   identifying, by the one or more processors and within the pre-generated graph data structure, a first intermediate node representing a first intermediate location, and a second intermediate node representing a second intermediate location by traversing the pre-generated graph data structure based on the pickup node and the destination node;
   determining, by the one or more processors, a plurality of transportation edges that each relate to a transit cost associated with a corresponding one of the pickup location, the first intermediate location, the second intermediate location, and the destination location, wherein each of the plurality of transportation edges correspond to one of the pickup node, the first intermediate node, the second intermediate node, and the destination node such that each of the pickup node, the first intermediate node, the second intermediate node, and the destination node corresponds to the transit cost;
   determining, by the one or more processors and using a location time machine-learning model trained on historical tender times, a tendering edge corresponding to the first intermediate node, the tendering edge relating to an actual tender time to move the good from a first vehicle that has arrived at the first intermediate location to a tender location of the first intermediate location;
   determining, by the one or more processor and using a cargo database, a cargo edge corresponding to the first intermediate node, the cargo edge relating to a time for loading the good onto a second vehicle upon receipt of the good at the first intermediate location;
   generating, by the one or more processors, a subgraph of the pre-generated graph data structure comprising the pickup node, the first intermediate node, the second intermediate node, the destination node, the tendering edge, the cargo edge, and the plurality of transportation edges; and
   generating a preferred route from the pickup location to the destination location having a lowest transit cost of transporting the good from the pickup location to the destination location based on the subgraph.

2. The computer-implemented method of claim 1, the generating of the pre-generated graph comprising:
   generating the subgraph of the pre-generated graph such that the subgraph is unique to the user request.

3. The computer-implemented method of claim 1, the generating of the preferred route comprising:
   generating the preferred route from a plurality of possible routes such that the preferred route has the lowest transit cost of the plurality of possible routes for transporting the good from the pickup location to the destination route,
   wherein the plurality of possible routes includes at least two of:
      a first possible route from the pickup location to the destination location,
      a second possible route from the pickup location to the first intermediate location to the destination location,
      a third possible route from the pickup location to the second intermediate location to the destination location,
      a fourth possible route from the pickup location to the first intermediate location to the second intermediate location to the destination location, and
      a fifth possible route from the pickup location to the second intermediate location to the first intermediate location to the destination location.

4. The computer-implemented method of claim 1, further comprising:
   identifying, while traversing the pre-generated graph data structure, at least two of a first possible path, a second possible path, a third possible path, a fourth possible path, and a fifth possible path for transporting the good from the pickup node to the destination node, wherein:
   the first possible path comprises a first segment connecting the pickup node to the destination node,
   the second possible path comprises a second segment connecting the pickup node to the first intermediate node and a third segment connecting the first intermediate node to the destination node, the third possible path comprises a fourth segment connecting the pickup node to the second intermediate node and a fifth segment connecting the second intermediate node to the destination node, the fourth possible path comprises the second segment connecting the pickup node to the first intermediate node, a sixth segment connecting the first intermediate node to the second intermediate node, and the fifth segment connecting the second intermediate node to the destination node, and the fifth possible path comprises the fourth segment connecting the pickup node to the second intermediate node, a seventh segment connecting the second intermediate node to the first intermediate node, and the third segment connecting the first intermediate node to the destination node.

5. The computer-implemented method of claim 4, wherein a first one and a second one of the first segment, the second segment, the third segment, the fourth segment, the fifth segment, the sixth segment, and the seventh segment comprise a first mode of transportation and a second mode of transportation, respectively.

6. The computer-implemented method of claim 5, wherein the first mode of transportation and the second mode of transportation comprises a vehicle and a flight, respectively.

7. The computer-implemented method of claim 1, wherein the user request is sent by a second user on behalf of the first user such that the first user is different than the second user and that the first user is seeking receipt of the good.

8. The computer-implemented method of claim 1, wherein the user request is sent by a user seeking receipt of the good.

9. The computer-implemented method of claim 1, wherein the user request further comprises a user-selected service type, and wherein the generating of the preferred route is further based on the user-selected service type.

10. The computer-implemented method of claim 9, wherein the user-selected service type is one of a plurality of available service types comprising at least two of a fastest routing, a recommended routing, an economy routing, and a drive-only routing.

11. The computer-implemented method of claim 10, wherein the recommended routing, the economy routing, and the drive-only routing are based on the transit cost.

12. The computer-implemented method of claim 11, wherein the transit cost is unique to a user submitting the user request.

13. The computer-implemented method of claim 12, further comprising:
    determining an actual cost for transporting the good from each of the pickup location, the first intermediate location, the second intermediate location, and the destination location to another one of the pickup location, the first intermediate location, the second intermediate location, and the destination location;
    determining a user value of time specific to the user for a period of time for transporting the good from the pickup location to the destination location; and
    determining the transit cost based on the actual cost and the user value of time.

14. The computer-implemented method of claim 13, further comprising:
    identifying a plurality of paths from the pickup location to the destination location,
    wherein each of the plurality of paths comprise at least one segment;
    determining a likelihood of approval of one or more segments of the plurality of paths for transporting the good from the pickup location to the destination;
    wherein the transit cost is further based on the likelihood of approval.

15. The computer-implemented method of claim 9, the generating of the preferred route from the pickup location to the destination location comprising:
    generating the preferred route from the pickup location to the destination location having the lowest transit cost based on the subgraph using a pathfinding algorithm.

16. The computer-implemented method of claim 15, wherein the pathfinding algorithm is A*.

17. A system, comprising:
    a memory; and
    a processor in communication with the memory and configured to:
    receive a user request for the transporting of the good from a pickup location to a destination location;
    identify, within a pre-generated graph data structure, a pickup node representing the pickup location and a destination node representing the destination location;
    identify, within the pre-generated graph data structure, a first intermediate node representing a first intermediate location, and a second intermediate node representing a second intermediate location by traversing the pre-generated graph based on the pickup node and the destination node;
    determine a plurality of transportation edges that each relating to a transit cost corresponding to one of the pickup location, the first intermediate location, the second intermediate location, and the destination location, wherein each of the plurality of transportation edges correspond to one of the pickup node, the first intermediate node, the second intermediate node, and the destination node such that each of the pickup node, the first intermediate node, the second intermediate node, and the destination node corresponds to the transit cost;
    determine, using a location time machine-learning model trained on historical tender times, a tendering edge corresponding to the first intermediate node, the tendering edge relating to an actual tender time to move the good from a first vehicle that has arrived at the first intermediate location to a tender location of the first intermediate location;
    determine, using a cargo database, a cargo edge corresponding to the first intermediate node, the cargo edge relating to a time for loading the good onto a second vehicle upon receipt of the good at the first intermediate location;
    generate a subgraph of the pre-generated graph comprising the pickup node, the first intermediate node, the second intermediate node, the destination node, the tendering edge, the cargo edge, and the plurality of transportation edges; and
    generate a preferred route from the pickup location to the destination location having a lowest transit cost of transporting the good from the pickup location to the destination location from the plurality of possible routes based on the subgraph.

18. A computer-readable storage device having instructions stored thereon, execution of which, by a processing device, causes the processing device to perform operations comprising:

receiving a user request for a transporting of a good from a pickup location to a destination location;

identifying, within a pre-generated graph data structure, a pickup node representing the pickup location and a destination node representing the destination location;

identifying, within the pre-generated graph data structure, a first intermediate node representing a first intermediate location, and a second intermediate node representing a second intermediate location by traversing the pre-generated graph based on the pickup node and the destination node;

determining a plurality of transportation edges that each relate to a transit cost for a corresponding one of the pickup location, the first intermediate location, the second intermediate location, and the destination location, wherein each of the plurality of transportation edges correspond to one of the pickup node, the first intermediate node, the second intermediate node, and the destination node such that each of the pickup node, the first intermediate node, the second intermediate node, and the destination node corresponds to the transit cost;

determining, using a location time machine-learning model trained on historical tender times, a tendering edge corresponding to the first intermediate node, the tendering edge relating to an actual tender time to move the good from a first vehicle that has arrived at the first intermediate location to a tender location of the first intermediate location;

determining, using a cargo database, a cargo edge corresponding to the first intermediate node, the cargo edge relating to a time for loading the good onto a second vehicle upon receipt of the good at the first intermediate location;

generating a subgraph of the pre-generated graph comprising the pickup node, the first intermediate node, the second intermediate node, the destination node, the tendering edge, the cargo edge, and the plurality of transportation edges; and generating a preferred route from the pickup location to the destination location having a lowest transit cost of transporting the good from the pickup location to the destination location based on the subgraph.

* * * * *

UNITED STATES PATENT AND TRADEMARK OFFICE
CERTIFICATE OF CORRECTION

| | | |
|---|---|---|
| PATENT NO. | : 10,936,992 B1 | Page 1 of 1 |
| APPLICATION NO. | : 16/940924 | |
| DATED | : March 2, 2021 | |
| INVENTOR(S) | : Rusnak et al. | |

It is certified that error appears in the above-identified patent and that said Letters Patent is hereby corrected as shown below:

On the Title Page

In the inventors Item (72), add inventor --Raja Sol Altenhoff, Carlsbad, CA.--

Signed and Sealed this
Eleventh Day of March, 2025

Coke Morgan Stewart
*Acting Director of the United States Patent and Trademark Office*